United States Patent
Lin et al.

(10) Patent No.: US 10,725,911 B2
(45) Date of Patent: Jul. 28, 2020

(54) NON-UNIFORM PAGINATION OF COLUMNAR DATA

(71) Applicant: SAP SE, Walldorf (DE)

(72) Inventors: Gary Lin, Toronto (CA); Reza Sherkat, Waterloo (CA); John Smirnios, Waterloo (CA)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 16/215,276

(22) Filed: Dec. 10, 2018

(65) Prior Publication Data
US 2020/0183839 A1 Jun. 11, 2020

(51) Int. Cl.
*G06F 16/25* (2019.01)
*G06F 12/0804* (2016.01)
*G06F 16/22* (2019.01)

(52) U.S. Cl.
CPC ...... *G06F 12/0804* (2013.01); *G06F 16/2246* (2019.01); *G06F 16/258* (2019.01); *G06F 2212/1044* (2013.01)

(58) Field of Classification Search
None
See application file for complete search history.

(56) References Cited

U.S. PATENT DOCUMENTS

| | | | | |
|---|---|---|---|---|
| 7,917,494 B2 * | 3/2011 | Muller | | G06F 16/28 707/711 |
| 8,412,684 B2 * | 4/2013 | Ushiyama | | G06F 16/2246 707/690 |
| 8,606,818 B2 * | 12/2013 | Leung | | G06F 16/838 707/795 |
| 8,639,673 B2 * | 1/2014 | Amit | | G06F 3/0608 707/693 |
| 2007/0061544 A1 | 3/2007 | Uppala | | |
| 2009/0240663 A1 | 9/2009 | Plattner et al. | | |
| 2014/0070966 A1 * | 3/2014 | Fablet | | H03M 7/3086 341/55 |
| 2015/0142819 A1 * | 5/2015 | Florendo | | G06F 16/22 707/741 |
| 2016/0012089 A1 | 1/2016 | Sherkat et al. | | |
| 2018/0074949 A1 * | 3/2018 | Verrilli | | G06F 12/023 |

FOREIGN PATENT DOCUMENTS

EP 2778961 A1 9/2014

OTHER PUBLICATIONS

Wikipedia, "In-memory database", Wikimedia Foundation, retrieved from "https://en.wikipedia.org/w/index.php?title=In-memory_database &oldid=862007885", Oct. 1, 2018, 4 pages.

(Continued)

*Primary Examiner* — Elias Mamo
(74) *Attorney, Agent, or Firm* — Fountainhead Law Group P.C.

(57) ABSTRACT

A computer implemented system and method of memory management for an in-memory database. The system implements a paged data vector using non-uniform compression of its chunks. In this manner, the system achieves greater compression than systems that use uniform compression.

30 Claims, 8 Drawing Sheets

(56) References Cited

OTHER PUBLICATIONS

Stratos Idreos et al, "MonetDB: Two Decades of Research in Column-oriented Database Architectures", Bulletin of the Technical Committee on Data Engineering, vol. 35, No. 1, Mar. 2012, 63 pages.

Wikipedia, "SAP HANA", Wikimedia Foundation, retrieved from "https://en.wikipedia.org/w/index.php?title=SAP_HANA&oldid=861705859", Sep. 29, 2018, 9 pages.

Sherkat et al., "Page As You Go: Piecewise Columnar Access in SAP HANA", Proceedings of the 2016 International Conference on Management of Data, Jun. 26, 2016, 12 pages.

Extended European Search Report, dated Mar. 9, 2020, 7 pages.

\* cited by examiner

Function *selectChunkSize(node)*

1:     choose an arbitrary *initialChunkSize*
2:     partition *node* into *chunks* of size *initialChunkSize*
3:     determine compression ratios $R_{avg}$, $R_{min}$, and $R_{max}$ of *chunks*
4:     ERROR_TOLERANCE ← 0.375
5:     *errorRatio* ← ( $R_{avg}$ - $R_{min}$ ) / $R_{avg}$
6:     if *errorRatio* ≤ ERROR_TOLERANCE then
7:         $R_{tar}$ ← $R_{min}$
8:     else then
9:         $R_{tar}$ ← 1
10:    $S_{min}$ ← 1 KiB
11:    $S_{tar}$ ← $R_{max}S_{min}$ / R
12:    $M$ ← *smallestFittingPage* ($S_{tar}$)     /* there may be no such $M$ */
13:    if $M$ is undefined then
14:         $S_{unc}$ ← $R_{max}S_{min}$
15:         *unalignedChunkSize* ← $\lfloor S_{unc} / n \rfloor$
16:         return *min(numOfRows(node) / 2, unalignedChunkSize)*
17:    else then
18:         *alignedToTargetChunkSize* ← $\lfloor MR / n \rfloor$   /* chunk size aligned to $M$ */
19:         return *min(numOfRows(node), alignedToTargetChunkSize)*

Function *encode(dataVector)*

1:     // *node* is the logical representation of the *dataVector/chunk*
2:     *chunkSize* ← *selectChunkSize(node)*
3:     partition *node* into *chunks* of size *chunkSize*
4:     for *chunk* in *chunks* do
5:     >temporary encode chunk into memory with optimal secondary compression method
6:     >if encoded chunk is oversized:
7:     >>encode subnode representing chunk recursively
8:     >else:
9:     >>move regular chunk into page chain

NON-UNIFORM PAGINATION OF COLUMNAR DATA

CROSS REFERENCE TO RELATED APPLICATIONS

Not applicable.

BACKGROUND

The present invention relates to in-memory database systems, and in particular, to memory management for in-memory database systems.

Unless otherwise indicated herein, the approaches described in this section are not prior art to the claims in this application and are not admitted to be prior art by inclusion in this section.

A database is an organized collection of data, stored and accessed electronically. Database designers typically organize the data to model aspects of reality in a way that supports processes requiring information.

A database management system (DBMS) is the software that interacts with end users, applications, and the database itself to capture and analyze data. A general-purpose DBMS allows the definition, creation, querying, update, and administration of databases. The sum total of the database, the DBMS and its associated applications can be referred to as a "database system". Often the term "database" is used to loosely refer to any of the DBMS, the database system or an application associated with the database.

An in-memory database system (IMDBS or IMDB, also main memory database system (MMDBS) or memory resident database (MRDB)) is a database management system that primarily relies on main memory for computer data storage. It is contrasted with database management systems that rely on a disk storage mechanism. In-memory databases are faster than disk-optimized databases because disk access is slower than memory access, and the internal optimization algorithms are simpler and execute fewer CPU instructions. Accessing data in memory eliminates seek time when querying the data, which provides faster and more predictable performance than disk. The memory of an IMDB may be volatile (e.g., random access memory) or non-volatile (e.g., flash memory). Although the IMDB is noteworthy for the aspect that it "primarily relies on main memory", the IMDB may also include a disk or other persistent storage (e.g., for backup purposes). (Of course, both non-IMDB systems and IMDB systems have memory, but one of ordinary skill in the database art appreciates that since the internal optimization algorithms differ, applying features developed for non-IMDB systems to IMDB systems is not at all straightforward.) An example IMDB is described in U.S. Application Pub. No. 2009/0240663. An example commercially available IMDB is the SAP HANA® in-memory data platform from SAP SE.

For an IMDB when the size of the data exceeds the size of the memory, the IMDB may include a memory management system to manage the portion of the data that is present in the main memory at a given time. In general, the memory management system coordinates storage of the data between the main memory and another component, such as a disk system. The memory management system may use a number of strategies to manage this coordination. One strategy is to partition the data into units (e.g., pages), to load particular units into the main memory when needed, and to replace those units with other pages as needed in the main memory.

An example memory management system for an IMDB is described in U.S. Application Pub. No. 2016/0012089.

SUMMARY

Given the above, a number of issues are presented. One issue is that when the data has been partitioned into units, ease of access by the memory management system is often preferred over space efficiency. Since the memory management system must determine exactly which unit contains a particular data record, generally the same compression (referred to as uniform compression) is applied to the data when partitioning the data into each unit. As a result, even though a different type of compression may result in better compression for a particular unit, the uniform compression is preferred since it is applicable to the data as a whole. An example of a uniform compression system is described in U.S. Application Pub. No. 2016/0012089, which implements uniform compression by applying its compression (dictionary compression and n-bit compression) to the set of value identifiers as a whole. There is a need for a technical solution to enable non-uniform compression, so that each unit may be compressed according to its own appropriate compression, while still enabling ease of access by the memory management system.

Embodiments are directed to addressing the above issue, and other issues, as discussed in more detail below. As a result, embodiments use non-uniform compression to enable more efficient data storage, while still having the ease of access, as compared to many existing systems that only implement uniform compression.

In one embodiment, a method performs memory management for an in-memory database. The method includes storing, in a secondary storage, a paged data vector. The paged data vector includes a plurality of chunks, the plurality of chunks are compressed using non-uniform compression, and the plurality of chunks are logically arranged in the paged data vector as a plurality of pages. The method further includes receiving a data request. The method further includes identifying a subset of the plurality of pages that relate to the data request. The method further includes loading, from the secondary storage to a main memory, at least one page of the subset of the plurality of pages that have been identified as relating to the data request. The method further includes executing the data request using the at least one page of the subset of the plurality of pages in the main memory.

For non-uniform compression, at least a first chunk may be compressed using a first compression type and at least a second chunk may be compressed using a second compression type. (The first chunk differs from the second chunk, and the first compression type differs from the second compression type.)

The paged data vector may be generated by a method that includes calculating a chunk size for a data vector, and encoding the data vector according to the chunk size to form a paged uniform-partition tree data structure corresponding to the paged data vector.

Calculating the chunk size may include selecting an initial chunk size and partitioning the data vector into a plurality of preliminary chunks. Calculating the chunk size may further include compressing each of the plurality of preliminary chunks using a respective selected compression type, and calculating a plurality of compression ratios. Calculating the chunk size may further include setting a target compression ratio based on comparing the compression ratios and an error tolerance. Calculating the chunk size may further include calculating a target space amount based on the compression ratios, and calculating a page size based on a smallest fitting page that fits the target space amount. The chunk size is calculated to minimally target the target compression ratio.

Encoding the data vector may include constructing a root node as a page chain, partitioning the data vector according to the chunk size to form the plurality of chunks, and encoding each of the plurality of chunks into a transient data structure using a respective selected compression type, where the page chain is initially an empty page chain. Encoding the data vector may further include moving each of the plurality of chunks that has a regular size from the transient data structure into a smallest fitting page, and appending each smallest fitting page onto the page chain.

Encoding the data vector may further include appending an empty page for each of the plurality of chunks that is oversized onto the page chain with a reference to a child node, and recursively storing each of the plurality of chunks that is oversized into a respective child node.

Identifying the subset of the plurality of pages that relate to the data request may include traversing the plurality of chunks in the paged data structure, starting at a root node, one chunk at a time.

The paged data vector may have a root node and at least one child node. The root node may correspond to a logical representation of the plurality of chunks, and a child node may corresponds to a single chunk of the plurality of chunks of the root node. The at least one child node may correspond to at least one oversize chunk, where a particular child node may correspond to a particular oversize chunk. The at least one child node may correspond to a plurality of child nodes including a first child node and a second child node, where the second child node may be a child of the first child node.

The paged data vector may have a root node that is a single node that contains the plurality of chunks.

A computer readable medium may store a computer program for controlling a computer to implement one or more steps of the above methods.

A system may implement one or more steps of the above methods, using a computer (e.g., a server computer, a database system, a client computer, etc.) to perform memory management for an in-memory database. The system may include at least one processor, a main memory, a secondary storage, a decoder component, and a page loader component. The system may further include a chunk size calculator component and an encoder component.

The following detailed description and accompanying drawings provide a better understanding of the nature and advantages of the present invention.

BRIEF DESCRIPTION OF THE DRAWINGS

FIG. 6 is code listing 600.

FIG. 7 is a code listing 700.

DETAILED DESCRIPTION

Figure 1:
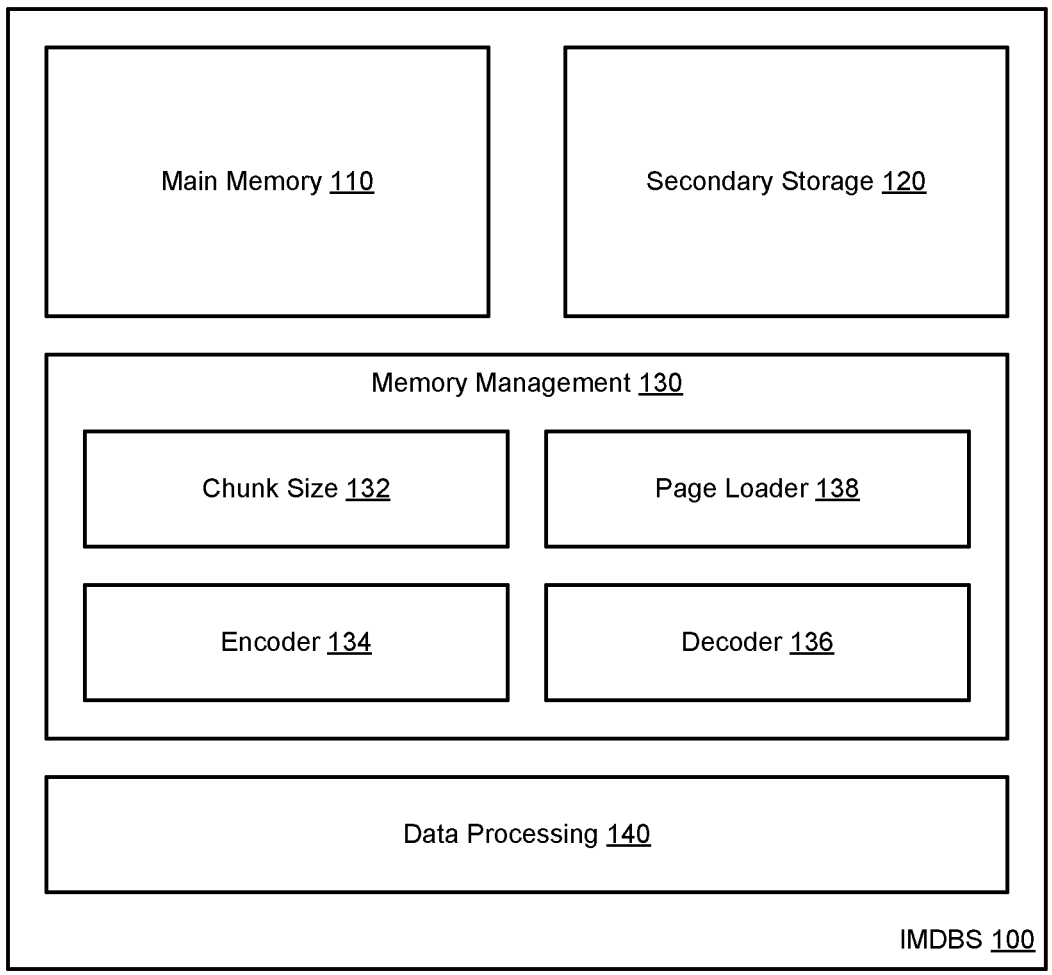
FIG. 1 is a block diagram of a computer system that implements an in-memory database system (IMDBS) 100.

Described herein are techniques for memory management in an in-memory database system. In the following description, for purposes of explanation, numerous examples and specific details are set forth in order to provide a thorough understanding of the systems and methods described herein. It will be evident, however, to one skilled in the art that the present invention as defined by the claims may include some or all of the features in these examples alone or in combination with other features described below, and may further include modifications and equivalents of the features and concepts described herein.

In this document, various methods, processes and procedures are detailed. Although particular steps may be described in a certain order, such order is mainly for convenience and clarity. A particular step may be repeated more than once, may occur before or after other steps (even if those steps are otherwise described in another order), and may occur in parallel with other steps. A second step is required to follow a first step only when the first step must be completed before the second step is begun. Such a situation will be specifically pointed out when not clear from the context.

In this document, the terms "and", "or" and "and/or" are used. Such terms are to be read as having an inclusive meaning. For example, "A and B" may mean at least the following: "both A and B", "at least both A and B". As another example, "A or B" may mean at least the following: "at least A", "at least B", "both A and B", "at least both A and B". As another example, "A and/or B" may mean at least the following: "A and B", "A or B". When an exclusive-or is intended, such will be specifically noted (e.g., "either A or B", "at most one of A and B").

In this document, the term "server" is used. In general, a server is a hardware device, and the descriptor "hardware" may be omitted in the discussion of a hardware server. A server may implement or execute a computer program that controls the functionality of the server. Such a computer program may also be referred to functionally as a server, or be described as implementing a server function; however, it is to be understood that the computer program implementing server functionality or controlling the hardware server is more precisely referred to as a "software server", a "server component", or a "server computer program".

In this document, the term "database" is used. In general, a database is a data structure to organize, store, and retrieve large amounts of data easily. A database may also be referred to as a data store. The term database is generally used to refer to a relational database, in which data is stored in the form of tables and the relationship among the data is also stored in the form of tables. A database management system (DBMS) generally refers to a hardware computer system (e.g., persistent memory such as a disk drive or flash drive, volatile memory such as random access memory, a processor, etc.) that implements a database.

In this document, the terms "to store", "stored" and "storing" are used. In general, these terms may be used to refer to an active verb (e.g., the process of storing, or changing from an un-stored state to a stored state), to a state of being (e.g., the state of being stored), or both. For example, "storing a data record" may be used to describe the process of storing (e.g., the data record transitioning from the un-stored state to the stored state). As another example, "storing a data record" may be used to describe the current state of a data record (e.g., the data record currently exists in the stored state as a result of being previously stored). When only a single interpretation is meant, such meaning will be apparent from the context.

FIG. 1 is a block diagram of a computer system that implements an in-memory database system (IMDBS) 100. The computer system may include one or more hardware components, the details of which are discussed in subsequent figures. The IMDBS 100 may be implemented by the computer system by executing one or more computer programs. The IMDBS 100 includes a main memory 110, a secondary storage 120, a memory management system 130, and a data processing system 140. The IMDBS 100 may also include other components (e.g., a persistence layer, etc.) that (for brevity) are not detailed.

The main memory 110 generally operates as the main memory for the IMDBS 100, in a manner similar to that for the other main memory database systems described above. The main memory 110 may be implemented with volatile memory components or non-volatile memory components. Suitable volatile memory components include random access memory (RAM), such as static RAM (SRAM) or dynamic RAM (DRAM). Suitable non-volatile memory components include flash memory.

The secondary storage 120 generally operates in coordination with the main memory 110, to store data whose size exceeds the capacity of the main memory 110. This allows the main memory 110 to be reduced in size, yet still operable on large data sets. Generally, the secondary storage 120 is slower and less costly (per data size unit) than the main memory 110. For example, if the main memory 110 is implemented with SRAM, the secondary storage 120 may be implemented with DRAM, flash memory, or a hard disk system.

The memory management system 130 generally coordinates the storage of data between the main memory 110 and the secondary storage 120. For example, when the IMDBS 100 needs a particular data record, the memory management system 130 loads that particular data record from the secondary storage 120 to the main memory 110. The memory management system 130 includes a chunk size calculator 132, an encoder component 134, a decoder component 136, and a page loader 138.

The chunk size calculator 132 calculates a chunk size for the data stored and processed by the IMDBS 100. As discussed in more detail below, a chunk of data is stored in a data structure referred to as a page. In general, data is loaded from the secondary storage 120 to the main memory 110 in chunks, and the chunk size calculator 132 calculates the chunk size as part of arranging the data for this purpose. The chunk size, and the chunk size calculator 132, are discussed in more detail in subsequent sections.

The encoder component 134 performs compression on the data stored and processed by the IMDBS 100. For example, the IMDBS 100 may operate on columnar data, and the data values in a particular column may be compressed (using various techniques) to reduce the size of data that needs to be stored in memory. The encoder component 134 also generates other data structures used by the IMDBS 100, such as the uniform partition tree (UPT) discussed in more detail below. In general, the encoder component 134 may perform compression on a per-chunk basis. This allows the encoder component 134 to apply different compression types to different chunks (e.g., non-uniform compression). (Such operation may be contrasted with uniform compression, which applies the same compression to an entire data column.) Compression, and the encoder component 134, are discussed in more detail in subsequent sections.

The decoder component 136 identifies a particular chunk (page) that contains a given data record. Since the chunks may have been compressed using different compression types, identifying the particular chunk is a non-trivial process. If the identified page is already in the main memory 110, then the IMDBS 100 may perform its processing on that chunk. If not, the decoder component 136 provides the information of the identified page to the page loader 138. This decoding process, and the decoder component 136, are discussed in more detail in subsequent sections.

The page loader 138 loads the page identified by the decoder component 136 from the secondary storage 120 to the main memory 110. In this manner, the page loader 138 coordinates the storage of data into the main memory 110 from the secondary storage 120. Page loading, and the page loader 138, are discussed in more detail in subsequent sections.

The data processing system 140 generally performs data processing on the data loaded into the main memory 110. The data processing may be transactional data processing, for example to add, delete, copy, modify or update a data record. The data processing may be analytical data processing, for example to execute queries on one or more data records.

The IMDBS 100 generally operates as follows. The IMDBS provides the option of using a page loadable column type as an alternative to a fully memory-resident column type for storing table data. The former approach allows for reducing the table load unit from the entire column to a fixed-size contiguous block of data, called a page. This generally results in less memory usage, especially under larger workloads. It is implemented with pageable versions of key data structures associated with each column, i.e. the encoded column content, its dictionary, and possibly its inverted index. The main column content, referred to as a data vector, corresponds to the data records of the column and constitutes the majority of memory usage of the column.

As discussed above regarding many existing systems, the data vector may suffer from severe space overhead when converted to its pageable counterpart. This is because the ease of value accessibility (i.e. row to page conversion) is preferred over space efficiency, and in these existing systems, only uniform compression is permitted for page loadable columns. To make identifying the page containing an encoded value easy, all data pages have the same size, even though all values on a page are identical, or the values per page compress well. This increases the memory footprint of the paged data vector.

To address the above problem, the IMDBS 100 implements a novel persistency layout with lossless compression of the paged data vector, that uses non-uniform pagination for equal-sized sections of the data vector. This approach is referred to as paged uniform-partition tree encoding (PUPTE). PUPTE involves new encoding and decoding processes, implemented by the encoder component 134 and the decoder component 136, to perform non-uniform compression. As compared to many existing systems, the IMDBS 100 indeed reduces the space consumption while still preserving the desired efficient random-page-access property of paged data vectors. This means that identifying the page corresponding to a row position is very close to uniform compression, whereas memory consumption can be significantly lower, especially when data vector compresses well.

Overview

The IMDBS 100 supports three methods of storing database table columns: (1) fully memory-resident columns, (2) page loadable columns, and (3) paged uniform-partition tree encoding (PUPTE).

1. Fully Memory-Resident Columns

When using fully memory-resident columns, an entire column is loaded into the main memory 110 for processing. The IMDBS may compress the column using dictionary compression and n-bit encoding on the entirety of the column to reduce the memory footprint.

2. Page Loadable Columns

Page loadable columns may enable even lesser memory usage in general than using fully memory-resident columns. The page loadable column method is achieved by loading and unloading only a fixed-size contiguous portion of data, called a page, from a column at a time from the secondary storage 120 to the main memory 110. With this strategy, only the pages of columns of the table that are actively needed will be kept in the main memory 110, thus optimizing the system usage of precious main memory. This can be crucial, especially when aiming for high performance for very large datasets with low cardinality or low diversity, where there is increased memory pressure. It can be unnecessarily expensive, or at times even impossible, to fit the entire table into the main memory 110. Page loadable columns may be implemented by providing pageable counterparts to primary and auxiliary data structures that were used to encode in-memory columns with dictionary compression. The problem is, while all paged versions of the data structures come with additional disadvantages, the one referred to as the data vector can suffer especially. The data vector is essentially an array of integers of bounded size.

For read-only portion of a column, the IMDBS 100 supports a variety of advanced compression methods, but for page loadable columns only applies uniform compression. Read-only paged data vectors use no better than dictionary compression and n-bit encoding, which uses only as many bits to literally store each value as is needed to store the largest value. For discussion purposes, the combination of dictionary compression and n-bit encoded data vectors is uniform compression. This is the cause for the performance degradation of paged data vectors. While they actively use less memory in general, if also accounting for disk space, the total space usage can be significantly greater than that of compressed in-memory data vectors. The reason paged data vectors currently do not support any further compression is due to the inherent trade-off between the simplicity of accessing values vs. space efficiency.

Indeed, this is also the case for the advanced compression methods supported by the IMDBS 100. Since each value can be encoded using a variable number of bits, many existing systems can no longer determine the precise location of any encoded value. Therefore, the ability of efficient random access is lost when variable length values are used. Decoding a value from compressed data typically involves a sequential traversal. However, this is not an option for paged data vectors. To minimize memory pressure, we want to be able to access any value without loading the entire table or entire column, and only load the page it is stored in. But if we can't figure out which page the data is stored in, at worst we could end up loading all pages in the column. In contrast, the uniformly compressed n-bit data vector supports random-access, so we can easily determine which page any value is in. This is done by dividing the desired row position by the number of values that fit per page, to identify the page number. It is however unnecessary to have total random-access; we do not need to know the precise position at which a value is stored at, but only the page it is stored in. It is sufficient to have what we term random-page-access, which is a form of semi-random-access in units of pages.

3. Paged Uniform-Partition Tree Encoding (PUPTE)

The third method, PUPTE, is directed toward finding a good balance for a paged data vector between compressing the data while still supporting random-page-access. This provides the flexibility of having fixed-to-variable coding. PUPTE uniformly partitions the data vector into fixed-size chunks, and encodes each chunk into its own page using the compression methods supported by the IMDBS 100. As a result, a chunk may be compressed with the compression type most appropriate for that particular chunk. This is referred to as non-uniform compression. (In contrast, for page loadable columns, uniform compression is performed for the entirety of a column.) Notice that since each chunk contains an equal number of values, the IMDBS 100 can determine which chunk any value is in with ease, and since each chunk is stored in one page, we can thus determine which page each value is stored in. At the same time, the IMDBS 100 continues to allow the compression of values, as is desired. The IMDBS 100 implements the encoding and decoding algorithms so that a paged data vector encoded with PUPTE (the third method) functions similarly to page loadable columns (the second method), just with a different underlying representation.

Further details of PUPTE as implemented by the IMDBS 100 are provided below.

Additional Details

The IMDBS 100 implements a columnar in-memory database. In-memory data can be stored consecutively on heap-allocated memory (method 1), in page loadable columns with page loadable data stored on fixed-size blocks of memory called pages for more efficient memory allocation (method 2), or with PUPTE (method 3). Supported page sizes range from 4 KiB to 1 MiB, and each is either two or four times larger than the previous page size class. Each page contains a page header for metadata, followed by slots to access the actual content. Pages may be organized into linked lists called page chains. For durability of data, there may also be disk storage that pages can be persisted to, which is handled by the persistence layer. A page may be loaded from disk into memory into a buffer pool called the page buffer, although if the page buffer is already full, few pages in the page buffer must first be evicted to make room.

The IMDBS 100 manages the storage of database tables. Tables are represented as a set of columns, and each column consists of two sections. The first is a read optimized section, termed the main fragment. The second is a write optimized section, termed the delta fragment. Changes do not modify data in place, but rather append new rows into the delta fragment. Changes are later brought in from the delta fragment into the main fragment in an operation called delta merge, which essentially reconstructs a new data vector. The main fragment is never really modified or added to—only rebuilt—and so we say it is read-only. Both column fragments use dictionary compression for efficient storage. This involves assigning a unique integer, referred to as the value identifier, to each unique value in the column. The actual column is then stored as a vector of value IDs that we call the data vector, or value ID array, one value for each row in the column, and a dictionary that maps a value ID to the value it refers to. Another data structure, called the inverted index, may also optionally be constructed to allow for efficient querying.

Columns may be fully memory resident (method 1), page loadable (method 2), or PUPTE (method 3). A page loadable column is designed so that performing a query on the column doesn't need the entire column in main memory. Data is stored in pages on disk, and only the pages that hold necessary data are loaded into the page buffer during a query. To implement page loadable columns, the three auxiliary data structures of columns were designed as page loadable counterparts that could be stored and accessed by units of pages.

Because the main fragment is often significantly larger than the delta fragment, they are natural candidate for compression. For fully memory-resident columns, the IMDBS 100 supports five advanced compression methods for main data vector: (1) prefix encoding, (2) run length encoding, (3) cluster encoding, (4) sparse encoding, and (5) indirect encoding. For paged data vectors however, using combinations of these compression methods is infeasible (except for uniform compression with dictionary compression and n-bit encoding), due to the challenges in efficient random-page-access that compression brings. This of course is the problem that PUPTE is directed to solve.

The remainder of the document uses the following notation:

n—Bit length of largest value in the data vector.

$S_{min}$—The minimum amount of space that any chunk should use.

enc(n)—The run-time of encoding data using the slowest compression method supported by the IMDBS 100, where n is the length of the data.

dec(n)—The run-time of decoding a value from data compressed using the slowest compression method supported by the IMDBS 100, where n is the length of the data.

Figure 2:
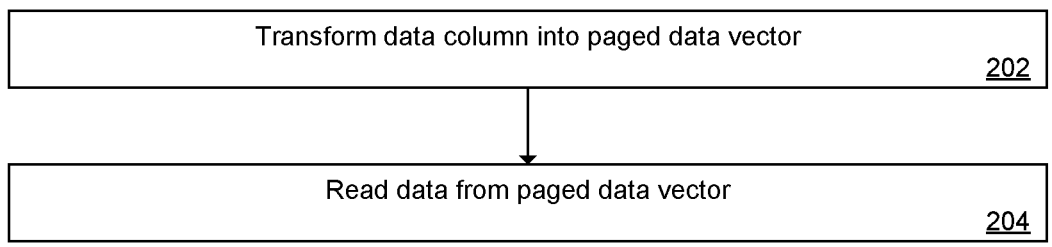
FIG. 2 is a flowchart of a method 200 of memory management for an in-memory database.

FIG. 2 is a flowchart of a method 200 of memory management for an in-memory database. The method 200 may be performed by the IMDBS 100 (see FIG. 1), for example by the memory management system 130.

At 202, a data column is transformed into a paged data vector. The paged data vector is generated according to PUPTE as discussed above (and as further detailed below). In brief, the data vector is divided into chunks, the chunks are stored in data structures referred to as pages, and the pages are arranged to form the paged data vector. The chunk size calculator 132 and the encoder component 134 (see FIG. 1) may implement this transformation, as further detailed below. The paged data vector is stored in the secondary storage 120.

At 204, data is read from the paged data vector (generated at 202). In general, this involves identifying the appropriate page in the paged data vector (which may be performed by the decoder component 136), and loading the identified page from the secondary storage 120 into the main memory 110 (which may be performed by the page loader component 138).

The step 202 may be viewed as a preliminary or setup step, for example during delta merge (discussed in more detail below), or at any other point at which a data vector is to be transformed into the paged data vector. The step 204 may be viewed as an operational step, for example as a part of the IMDBS 100 performing its data processing operations such as transactional data processing, analytical data processing, etc.

Uniform Partition Tree

Figure 3:
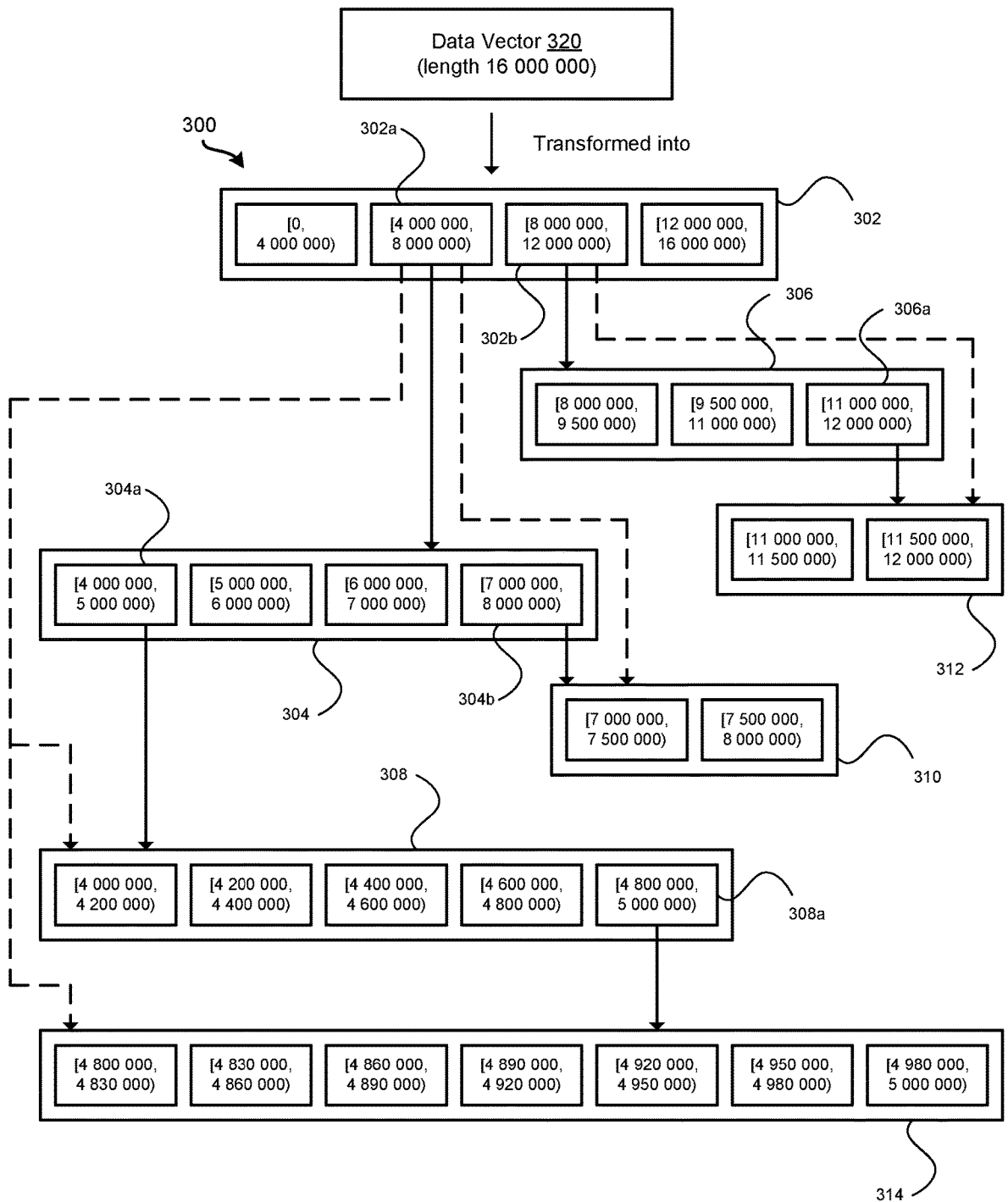
FIG. 3 is a block diagram of a logical representation of a uniform partition tree (UPT) 300.

FIG. 3 is a block diagram of a logical representation of a uniform partition tree (UPT) 300, also referred to as a paged uniform partition tree (PUPT). The UPT 300 is a data structure used in the PUPTE memory management process. The specific UPT 300 shown in FIG. 3 is an example, and the specific arrangements of the nodes, references and chunks may vary depending on the specifics of the data vector.

In general, the UPTO 300 logically represents the data vector as a tree. The tree has a root node 302, and may have a number of child nodes (also referred to as sub-nodes); shown here are child nodes 304, 306, 308, 310, 312 and 314. Each node of the UPT corresponds to segments of a data vector 320, and further uniformly partitions the data the data vector 320 refers to into fixed-size chunks. Each chunk has a selected size. For example, the data vector 320 has a length of 16 000 000 records, and the nodes 302, 304, 306, 308, 310, 312 and 314 have respective chunk sizes of 4 000 000, 1 000 000, 1 500 000, 200 000, 500 000, 500 000 and 30 000. The last chunk of a node is permitted to have fewer value IDs than the selected size. (Here, the last chunk in the child node 306 has 1 000 000 value IDs, and the last chunk in the child node 314 has 20 000 value IDs). The content of each node is a list of chunks of data it represents. In a special case (explained below), a chunk of one node (referred to as the parent node) is represented by an additional node (a child node). The parent node has a link to the child node; this link is represented by a solid arrow. For example, the node 304 is a child node of the root node 302, and the node 310 is a child node of the node 304. The root node 302 corresponds to the entire data vector, and subsequent nodes correspond to chunks of previous nodes. Essentially then, the IMDBS 100 (see FIG. 1) uniformly partitions the entire data vector 320 into fixed-size chunks; certain chunks may be further uniformly partitioned if necessary (as detailed below). To prevent infinite recursion, any sub-node uses a chunk size less than that of its parent, so that there are at least two chunks in the sub-node. Contrarily, the root node 302 that corresponds to the entire data vector may use a chunk size equal to the size of the entire data vector so that there is only one chunk; in such a case, the IMDBS 100 may implement page loadable columns using uniform compression (method 2) described above.

Each node of the UPT 300 has an associated chunk size N, and contains chunks of the data vector 320 of that same size, with possibly the exception of the last chunk in each node (here, the last chunks of the nodes 306 and 314). The chunk size strictly decreases with the depth of the node. The chunks of a node (at the tip of a solid arrow) also collectively form a chunk in its parent node that it corresponds to (at the tail of the same arrow), except for the root node 302 whose chunks collectively form the entire data vector 320. While the nodes in the example UPT 300 do not contain many chunks, in practice, a single node may contain hundreds if not thousands of chunks.

To store each node, the IMDBS 100 allocates one page for each chunk. For a chunk that does not correspond to another node, the IMDBS 100 individually compresses the chunk using the optimal encoding scheme for it, and stores the compressed chunk in the page it was allocated. To distinguish the overall encoding scheme from the compression method used on the chunks, the latter may be referred to as secondary compression. In each page, the IMDBS 100 stores enough information to decode any value in that chunk without loading any other page. Now, different chunks will usually require different amounts of space (due to the different chunk sizes and the different compression types), and having to allocate each chunk an entire page at a time makes it difficult to efficiently accommodate all chunks due to internal fragmentation. Fortunately, the IMDBS uses multi-sized pages to help mitigate this issue by letting each chunk use the best fitting page, which is of the smallest available size that is large enough to fit the compressed contents. Each node is thus stored as a sequence of pages, one for each chunk. To store the entire UPT 300, the IMDBS 100 appends all sequences of pages for all the nodes together into a single page chain.

The reason that the IMDBS 100 may use a child node for a particular chunk is if storing that particular chunk requires more space than can fit in even the largest available page size. Such chunks are referred to as oversized. For example, the chunks 302a, 302b, 304a, 304b, 306a and 308a are oversized chunks. The other chunks are referred to as regular or regular sized. For oversized chunks, instead of storing the chunk's data along with the node it belongs to, the IMDBS 100 creates a new node for the oversized chunk, thus recursively storing its data within a separate sequence of pages. For example, the child node 304 is created for the oversized chunk 302a.

Since the UPT may have a large height (e.g., multiple levels of child nodes), determining which node the value ID of a row is stored in should not involve repeatedly referencing a child-node from the parent node starting from the root node. This is because presumably, each such reference may involve loading a page from disk to redirect to the next page. This is an expensive operation with large memory overhead. Instead, the IMDBS 100 stores references within the pages of oversized chunks in the root node so that all non-root nodes can be accessed from the root node. These references are indicated by the dotted arrows in FIG. 3 from the root node 302 to the various child nodes that do not have a direct link to the root node 302 (as indicated by the solid arrows).

More implementation details are discussed below.

Again, the IMDBS 100 uses the child nodes in addition to the root node 302 in order to support oversized chunks. These should only exist if some part of the data vector 320 can be significantly better compressed than another part, specifically by a factor greater than the ratio between the largest page size and the smallest page size, which is not all that common. So, probably for many cases, a UPT for a data vector has only one node (e.g., the root node 302), and the data vector is uniformly partitioned only once, which comes with much simpler encoding and decoding. The inclusion of oversized chunk processing is so that the implementation of PUPTE handles all exceptional cases. When the IMDBS 100 encounters an oversized chunk, it uses multiple pages to store it, but the IMDBS 100 will also continue to preserve good compression rates and access to a small number of pages at the same time. Recall that this was what PUPTE was the intended solution for, just over the entire data vector. This was the motivation behind making the encoding scheme recursive.

Overall, the PUPTE process provides a compromise to the trade-off explained earlier. A noteworthy feature of the PUPTE process is uniform partitioning. Having fixed-size chunks means that the IMDBS 100 can determine which chunk the value ID of any row is stored in with simple arithmetic. Storing each chunk in one page means that the IMDBS 100 can determine which page to load right away. At the same time, the IMDBS 100 continues to make use of secondary compression methods of value IDs.

Finally, recall that dictionary compression guarantees that each data vector in fact consists of only integers, even if the column has a different datatype such as float or variable length character sequence (varchar). While PUPTE was devised specifically for compressing the data vector (which is an integer array), it can be generalized to work with any array of fixed size values if the fixed size values have compression methods that are appropriate to be used on them.

Figure 4:
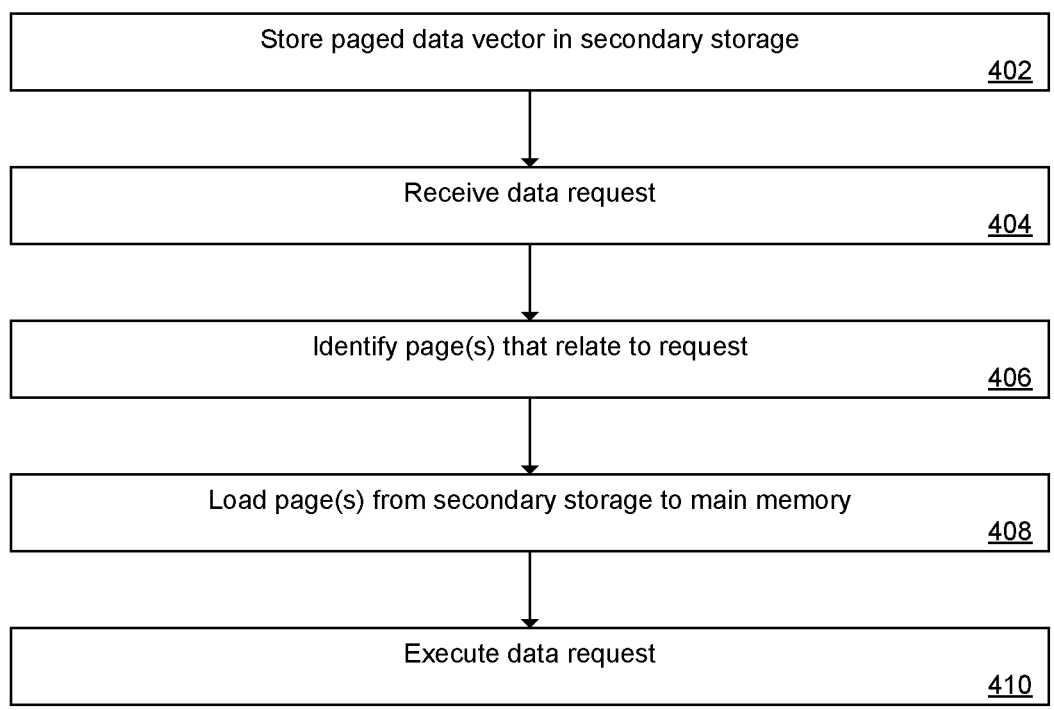
FIG. 4 is a flowchart of a method 400 of memory management for an in-memory database.

FIG. 4 is a flowchart of a method 400 of memory management for an in-memory database. The method 400 may be performed by the IMDBS 100 (see FIG. 1), for example by the memory management system 130 and other components. As compared to the method 200 (see FIG. 2), the method 400 is more directed to describing the IMDBS 100 in operation.

At 402, a paged data vector is stored in a secondary storage. (As mentioned above, this wording also includes that the paged data vector is in the state of existence of having been stored; for example, when the paged data vector has been previously generated such as at 202 in FIG. 2.) For example, the IMDBS 100 may store the paged data vector in the secondary storage 120. The paged data vector includes a number of chunks that are compressed using non-uniform compression. Non-uniform compression is discussed in more detail below, but in general, at least one chunk is compressed using a first compression type, and at least one other chunk is compressed using a second compression type. (The first compression type may differ from the second compression type.) For example, one chunk may be compressed using prefix encoding, and another chunk may be compressed using cluster encoding. The chunks are logically arranged in the paged data vector as a number of pages (as further detailed below). The paged data vector may correspond to the UPT 300 data structure (see FIG. 3).

At 404, a data request is received. For example, the data processing component 140 may receive the data request. The data request may be a transactional request (e.g., to edit, add, delete, etc. a particular data record), an analytical request (e.g., to execute a query on one or more data records), etc.

At 406, a subset of the plurality of pages that relate to the data request is identified. For example, the decoding component 136 may identify one or more pages in the paged data vector stored in the secondary storage 120 that relate to the data request. As mentioned above and as discussed in more detail below, when different portions of a column (e.g., chunks) are compressed using different compression types, this results in non-uniform compression. When a column has been non-uniformly compressed, identifying the page that contains a particular data record is a non-trivial process, as further detailed below.

At 408, at least one page of the subset of the plurality of pages (that were identified at 406) are loaded from the secondary storage into a main memory. For example, the page loader component 138 may load a page from the paged data vector stored in the secondary storage 120 into the main memory 110.

At 410, the data request is executed, using the at least one page from the main memory (that was loaded at 408). For example, the data processing component 140 may access data in the pages loaded in the main memory 110, in order to execute the data request. The data processing component 140 may then provide the results of the data request (e.g., the output of the query, etc.) to the IMDBS 100 or other components.

Figure 5:
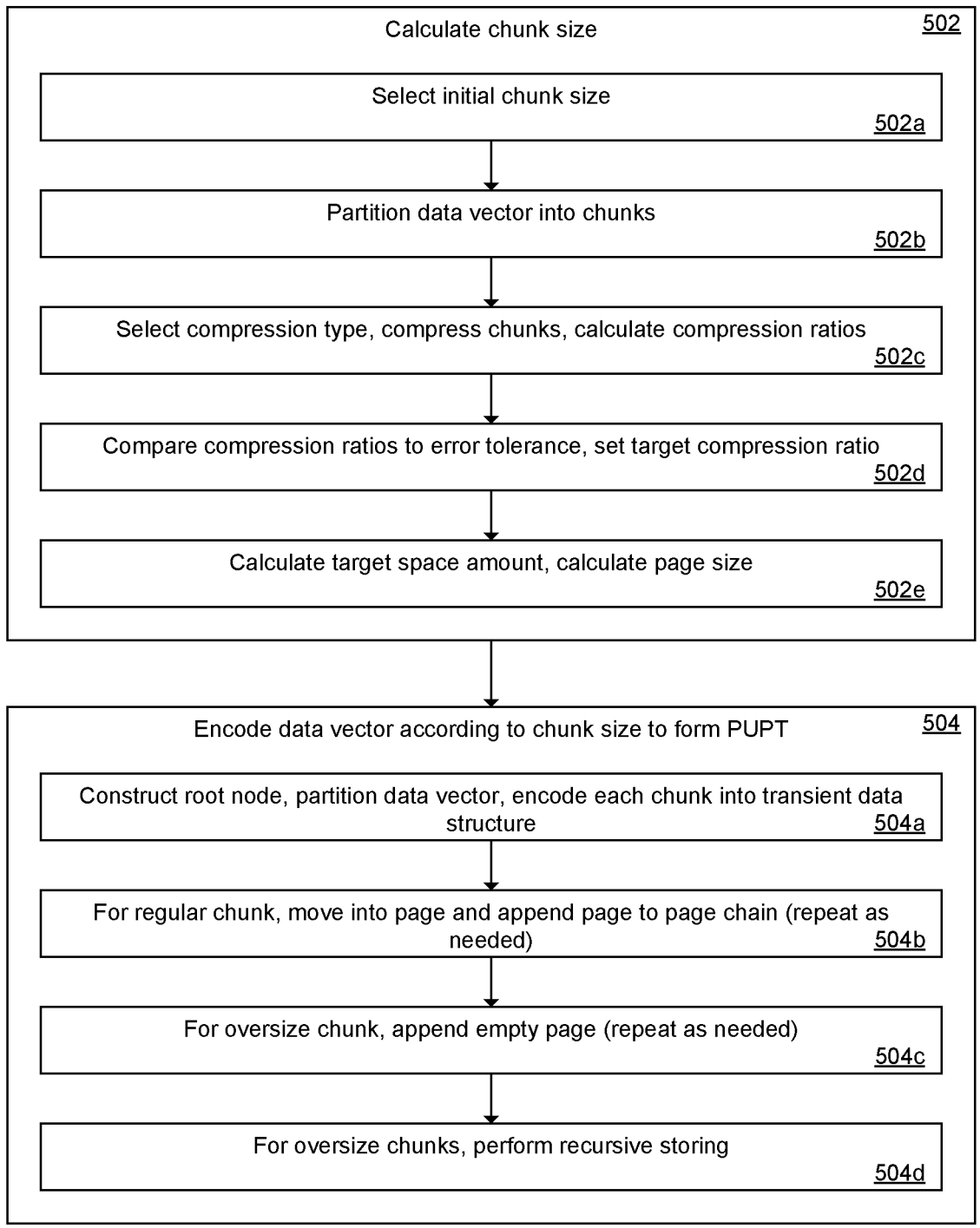
FIG. 5 is a flowchart of a method 500 of generating a paged data vector.

FIG. 5 is a flowchart of a method 500 of generating a paged data vector. The method 500 may be performed as steps or sub-steps of 202 (see FIG. 2). The method 500 may be performed by the memory management system 130 (see FIG. 1), for example by using the chunk size calculator 132 and the encoder component 134.

At 502, a chunk size is calculated for a data vector. The data vector generally corresponds to the data records of a column, and may be stored in the secondary storage 120. Each chunk corresponds to a segment of the data vector (e.g., 1000 rows or data records). Calculating the chunk size includes the sub-steps 502a-502e.

At 502a, an initial chunk size is selected. As an example, the initial chunk size may be set to 10% of the total size of the data vector. The initial chunk size may be adjusted as desired according to the characteristics and the performance of the components of the IMDBS 100. The chunk size calculator 132 may select the initial chunk size.

At 502b, the data vector is partitioned into chunks (according to the initial chunk size) to form a data structure referred to as a node. The last chunk may be smaller than the chunk size if the data vector does not divide evenly into the chunks. The encoder component 134 may partition the data vector into the chunks.

At 502c, a suitable compression type is selected for each chunk, each chunk is compressed using the selected compression type, and various compression ratios are calculated on the compressed chunks. The various compression ratios may include an average compression ratio $R_{avg}$, a minimum compression ratio $R_{min}$, and a maximum compression ratio $R_{max}$ for each chunk. The compression type selected at this point is an initial compression to simulate the overall encoding process (once the initial chunk size has been adjusted, as needed, into the final chunk size). In general, the suitable compression type corresponds to the most appropriate compression type for that particular chunk (e.g., that results in the highest compression ratio). For example, a set of compression types may be applied to the chunk, and the one with the highest compression ratio may be selected. The encoder component 134 may select the suitable compression type, compress each chunk, and calculate the compression ratios.

At 502d, the compression ratios (calculated at 502c) are compared to an error tolerance. Based on this comparison, a target compression ratio $R_{tar}$ is set to the minimum compression ratio if the error tolerance is met, or otherwise the target compression ratio is set to 1. The encoder component 134 may evaluate the error tolerance and set the target compression ratio.

At 502e, a target space amount $S_{tar}$ is calculated based on the maximum compression ratio $R_{max}$ and the compression ratio R, and a page size M is calculated based on the smallest fitting page that fits the target space amount $S_{tar}$. The chunk size is then calculated to minimally target the target compression ratio $R_{tar}$.

At 504, the data vector is encoded according to the chunk size (calculated at 502) to form a paged uniform-partition tree (PUPT) data structure (also referred to as a UPT data structure, see FIG. 3). The encoding component 134 (see FIG. 1) may encode the data vector. Encoding the data vector includes sub-steps 504a-504d.

At 504a, a root node is constructed as an empty page chain, the data vector is partitioned according to the chunk size (calculated at 502), and each chunk is encoded into a transient data structure using a selected compression type.

At 504b, if a particular chunk has regular size (as further described below), the encoded data is moved from the transient data structure into the smallest fitting page, and that page is appended to the page chain.

At 504c, if a particular chunk is oversized (as further described below), an empty page is appended to the page chain, with a reference to a child node.

The steps 504b and 504c continue until all the chunks have been processed. Once all the chunks have been processed, all the regular sized chunks will have been moved from the transient data structure (see 504b), and only the oversize chunks are in the transient data structure.

At 504d, each oversized chunk is recursively stored by moving it from the transient data structure into a child node. As described in more detail below, each child node is generated like the root node (at 504a-504c), but as applied to each particular oversized chunk (instead of the entire data vector).

As a result of these steps, the root node (and any child nodes) form the page chain corresponding to the paged uniform-partition tree (PUPT), such as the UPT 300 of FIG. 3.

Chunk Size Selection

This section provides further details on determining the chunk size (see 502 in FIG. 5). Factors that affect the selection of chunk size typically fall under two categories: (1) magnitude, and (2) alignment.

1. Magnitude

Regarding the magnitude factor, some reasons for choosing a smaller chunk size are as follows. First, the chunk size obviously must not exceed the length of the node. Moreover, if there is a possibility of having oversized chunks, the IMDBS 100 (see FIG. 1) needs to make sure that the chunk size is strictly less than the size of the node to prevent infinite recursion. These are strict upper bounds in that they should not under any circumstance be broken.

Second, smaller chunk sizes allow the IMDBS 100 to take advantage of data with inconsistent patterns. If the system uses large chunks, the data in the chunks may have nothing in common, making it difficult to compress. Instead, it could be better to try to optimize off whatever short, localized patterns we are able to find scattered throughout the data vector. For this, the system would want smaller chunks so that individual chunks are more likely to be correlated and hence compressed.

Third, in encoding schemes where location offsets or lengths are stored, the IMDBS 100 can choose to reference from the start of the chunk instead of the start of the data vector or node. Using smaller chunk sizes would require fewer bits to store these values.

Some reasons for choosing a larger chunk size are as follows. First, observe that a smaller chunk size results in using more chunks, which in turn results in using more pages. So, using smaller chunks could only be beneficial if smaller pages were used. However, if the chunk size is too small for chunks to use the smallest available page size, then there would be no benefit in reducing the chunk size any further. Doing so would result in continuing to use pages of the same size, but having more pages, resulting in unnecessarily wasted space. Thus, the system would ideally like to make sure that the chunk size is large enough so that no chunk requires too little space.

Second, if the chunk size is too small, the system will not be able to save as much space for data sets that can potentially be very well compressed. For example, suppose the system can compress every 10,000 values to use the space of 1 chunk. If the system uses a chunk size of 1,000, then to save the same amount of space, it would need to store every 1000 values with just 0.1 values, which we can assume to be impossible. In general, using a larger chunk size increases the maximum compressibility of the chunks.

In summary, the following points are evident. First, there are strict upper bounds for chunk size. It must be no more than the length of the data vector, and if there are oversized chunks, it must be strictly less than the length of the data vector.

Second, there are preferred lower bounds for the chunk size. It should be large enough so that the most compressed chunk doesn't use up too little space. This happens to take care of both concerns for small chunk sizes.

Third, there are general reasons for using smaller chunk sizes. Data with low correlation is more likely to be better compressed because individual smaller chunks are more likely to have a common pattern in them. Also, certain quantities such as position and length need fewer bits to be stored when referring to small containers (e.g. chunks, node, or data vector) over larger containers.

While there may be many other considerations that have not yet been factored in, these few give the IMDBS 100 a general guideline to aim for, and happen to be almost all simultaneously satisfiable. The system should aim to take the smallest chunk size within the upper and lower bounds, and if the upper and lower bounds conflict, the upper bound takes priority; this is because when data does not compress well, there is no gain in picking smaller chunk size.

2. Alignment

Regarding the alignment factor, depending on the data distribution of the data vector, the IMDBS 100 may find that however it determines the chunk size, many chunks in a node require approximately the same amount of space. In such a case, the IMDBS 100 may adjust its choice slightly to make sure that each chunk's space practically fills one of the available page sizes to minimize the memory overhead. This process is referred to as alignment. Even if there is a large variance in space used by different chunks, the IMDBS 100 still may attempt using alignment for uncompressible chunks because it knows these are always fixed in size. Note that the IMDBS 100 should also account for all chunks when doing this alignment. The IMDBS 100 may not necessarily want a chunk requiring the average space to be aligned, because any chunk that uses a bit more space than that will end up using the next larger page size.

In summary, the criteria to be satisfied, in order of priority, are as follows. Criterion 1: The IMDBS 100 should ensure that the chunk size satisfies an upper bound: not greater than length of the node, and strictly less than length of node if there are oversized chunks. Criterion 2: The IMDBS 100 should use alignment so that most chunks are close to maximally filling the page they were allocated. Criterion 3: The IMDBS 100 should ensure that even the chunks using the least amount of space fill up a substantial fraction of the page they were allocated. Criterion 4: The IMDBS 100 should prefer a smaller chunk size as compared to a larger chunk size when the other considerations are the same.

We make use of the following definition to understand what it means to satisfy the Criterion 2 (alignment):

Definition: Aligned to Page. A chunk size N is aligned to a page of size M for the compression ratio R if the chunk almost perfectly fills in a page of size M. As an equation:

$$N = \left\lfloor \frac{MR}{n} \right\rfloor$$

It is more convenient to work with compression ratios (uncompressed/compressed) instead of the exact space used by chunks because when the IMDBS 100 changes the chunk size, so does the used space. On the other hand, compression ratios are independent of chunk size (for the most part; see the Alternative Embodiments section below).

We now examine the requirements for satisfying Criterion 3 (amount of space). TABLE 1 below summarizes the range of used space percentiles for different ranges of required space:

TABLE 1

| Required Space | Allocated Space | Percentage of Used Space |
| --- | --- | --- |
| (1 b) to (4 KiB) | 4 kB | ~0% to 100% |
| (4 KiB + 1 b) to (16 KiB) | 16 kB | ~25% to 100% |
| (16 KiB + 1 b) to (64 KiB) | 64 kB | ~25% to 100% |
| (64 KiB + 1 b) to (128 KiB) | 128 kB | ~50% to 100% |
| (128 KiB + 1 b) to (256 KiB) | 256 kB | ~50% to 100% |
| (256 KiB + 1 b) to (512 KiB) | 512 kB | ~50% to 100% |
| (512 KiB + 1 b) to (1 MiB) | 1 MiB | ~50% to 100% |

Notice from TABLE 1 that only when the smallest page size is allocated, there is a chance for less than 25% of a page to be used (even better results can be achieved based on the granularity of the available page sizes). Thus, the IMDBS 100 has an incentive to ensure that the minimum space used by all chunks—particularly the most compressible chunks—is at least 25% of the smallest page size. The minimum allowed space for any chunk is calculated according to the following equation:

$$S_{min} = 25\% \times 4 \text{ kB} = 1 \text{ kB}$$

Hence, we want our uncompressed chunks to use at least:

$$S_{unc} = R_{max} S_{min}$$

In general, a chunk with a compression ratio of R should use at least:

$$S = \frac{S_{unc}}{R} = \frac{R_{max} S_{min}}{R}$$

Definition: Minimally Targeted to Compression ratio. Given compression ratio R, $R_{max}$ and $S_{min}$, a chunk size N is targeted to compression ratio R if there exists a page size M where the chunk almost perfectly fills in a page of size M. Moreover, we say N is minimally targeted to R if it also guarantees the minimum requirement that a chunk with compression ratio $R_{max}$ uses at least $S_{min}$ space, and is the smallest possible such chunk size. To determine this N, the IMDBS 100 calculates the smallest page size M that is larger than $$S = \frac{R_{max} S_{min}}{R},$$

and then takes the chunk size aligned to a page of size M.

Note that if $R_{max} \gg R$ so that a chunk compressed by a factor of only R uses more space than the largest page size, then there is no such valid N. In this case, if the IMDBS 100 tries to ensure that chunks compressed by $R_{max}$ don't use too little space, chunks compressed by R will end up as oversized. Otherwise, for each R there is only one such N.

Let $S_{min}$ be the minimum space where the corresponding page for a chunk does not waste too much space. A suitable candidate for $S_{min}$ is 1 kB.

To select a chunk size, the IMDBS 100 first determines some measurements of the average, minimum, and maximum compression ratio of different chunks within the data vector, $R_{avg}$, $R_{min}$ and $R_{max}$ respectively. To do this, the IMDBS 100 selects some initial chunk size, and simulate the encoding scheme to compute the space required to encode each chunk using the best compression method. The IMDBS 100 then aggregates these results to determine the summary measurements in terms of required space, and then computes the corresponding counterparts for compression ratios.

Next, the IMDBS 100 operates to satisfy Criteria 2-4 by minimally targeting some compression ratio, which mostly involves alignment. If there is too much variance in chunk sizes from the average, then the IMDBS 100 operates to target R=1 for alignment so that uncompressible chunks benefit the most. This is because the only chunks that are guaranteed to use the same amount of space are uncompressible. On the other hand, if the variance in chunk sizes is sufficiently small, then the IMDBS 100 operates to target some specialized target ratio $R_{tar}$ which is close to $R_{avg}$. In general, the system is more concerned with chunks that use more space than the average (or equivalently, have a smaller compression ratio than average) because these chunks have a chance of using a page of up to 4× the size as the average chunk if we do not control alignment properly. Therefore, the IMDBS 100 measure only the lower variability of compression ratio. One option for accounting for variability is to measure the maximum lower deviation of the compression ratio from the average, that is $R_{error}=R_{avg}-R_{min}$. When $R_{error}$ is sufficiently small, the IMDBS 100 takes $R_{tar}=R_{min}$ so that the largest chunks would experience the most alignment, although the average chunk compressed by $R_{avg}$ shouldn't be too far off either. Now, as $R_{error}$ increases, $R_{avg}$ increases further from $R_{min}$, and so chunks with $R_{avg}$ compressibility fill less and less of their page, which is undesirable. The IMDBS 100 may consider $R_{error}$ to be small enough for it to use alignment if aligning would save more space than using no alignment in general. Recall that all our pages should be at least 25% to 100% full, and thus on average 62.5% full. Assuming chunks with compressibility $R_{min}$ fill their page, we want:

$$\frac{R_{min}}{R_{avg}} = \frac{R_{avg} - R_{error}}{R_{avg}} \geq 0.625$$

$$1 - \frac{R_{error}}{R_{avg}} \geq 0.625$$

$$\frac{R_{error}}{R_{avg}} \leq 0.375$$

Finally, if there exists a chunk size that is minimally targeted to $R_{tar}$, then the IMDBS 100 takes N to be the minimum between that chunk size and the length of the node (Criterion 1). Otherwise, a chunk compressed by a factor of $R_{tar}$ or less must be oversized, and so the IMDBS 100 does not bother with alignment. The partition size that does not use alignment, but still meets the minimum size requirement and is as small as possible (Criteria 3 and 4) is as follows:

$$\left\lfloor \frac{S_{unc}}{n} \right\rfloor = \left\lfloor \frac{R_{max} S_{min}}{n} \right\rfloor$$

Since chunks may be oversized, the IMDBS 100 implements a special upper bound to prevent infinite recursion by taking the minimum between half the length of the node and this value.

FIG. 6 is code listing 600. The code listing 600 provides a full statement of the chunk size selection process (as described above, and also at 502 in FIG. 5) in pseudo-code.

Chunk size selection according to the process described above involves determining how much space each chunk would use by essentially applying the compression method directly on the chunk. The next steps, which are aggregating these results and other arithmetic, all use constant time.

Each chunk has size N, and there are L/N chunks. Thus, storing all chunks has time complexity given by the following equation:

$$O\left(\frac{L}{N} enc(N)\right)$$

Since encoding requires at least looking at each value of the data vector once, we know the following:

$$enc(n) \in \Omega(n)$$

Thus, we can less precisely but more usefully say that regardless of N, storing chunks is as follows:

$$O(enc(L))$$

Since N is no greater than L, the above suggests it is equivalent to the running time of encoding the entire data vector. This is also the running time of chunk size selection.

Encoding

This section provides further details for the encoding process (see 504 in FIG. 5). As mentioned above, the result of this encoding process is a PUPTE data structure (see FIG. 3) that contains the data vector.

The IMDBS 100 (see FIG. 1) performs encoding of the data structure one node at a time, starting with the root node (see 302 in FIG. 3). The IMDBS 100 begins with an empty page chain. For each node, the IMDBS 100 first selects a chunk size for the node, using the process described above (e.g., 502 in FIG. 5, the listing 600 of FIG. 6, and related text). Then for each chunk in the node, the IMDBS 100 encodes the chunk into a transient data structure that can be arbitrarily large with the optimal compression method that can be used on it. (See also 504a in FIG. 5.) Then the IMDBS 100 measures how much space this encoded chunk uses (in order to determine whether this chunk is regular or oversized), and sets a bit flag indicating which type it is. If the chunk is regular, the IMDBS 100 copies the encoded data in the transient data structure over into the smallest fitting page, and appends this page to the running page chain. (See also 504b in FIG. 5.) Otherwise, the IMDBS 100 appends an empty page to the chain and makes a note (e.g. append to a queue) that this chunk was oversized and needs to be stored recursively later using smaller chunks. (See also 504c in FIG. 5.) If the current node is the root node, eventually the IMDBS 100 will store references to other nodes in this page. Otherwise, this empty page may be unused for the most part because the actual data will be stored in another sequence of pages. It is still useful to have this page to preserve uniformity in the data structure. This may waste some space, but likely not very much in proportion to the amount used given that this chunk is oversized and cannot even fit in the largest page. The IMDBS 100 may mitigate this issue by storing other metadata on this page.

After all chunks in the node have been processed, the IMDBS 100 moves on to recursively store each oversized chunk that was marked for a return. (See also 504d in FIG. 5.) If the current node is not the root node, the IMDBS 100 also needs to append a reference to this node in the correct page in the root node. This page should be the one whose corresponding chunk contains the (sub-)chunk corresponding to this node. This reference may be a tuple of the form (s, e, N, p), where s and e are the start and end rows of the node, N is the chunk size of the node, and p is the logical page number of the node. Alternatives may be used to provide information for decoding. Adding the reference to this node should occur after all child nodes of this node have been recursively encoded. This way, references to the child nodes occur before parent node references. Ultimately, due to the order of insertion, node reference lists in the root node should be ordered with e as the primary key sorted in decreasing order, and s as the secondary key sorted in increasing order. This ordering ensures that (1) preceding nodes occur before nodes that come next in the sorting order, and (2) child nodes occur before parent nodes.

Metadata for the page chain may at least consist of $N_{root}$, L, and n, namely the root chunk size, the length of the data vector, and the bit length.

FIG. 7 is a code listing 700. The code listing 700 provides a full statement of the encoding process (as described above, and also at 504 in FIG. 5) in pseudo-code.

Complexity Analysis for Encoding

This section discusses the complexity of the PUPTE page generation process (see 500 in FIG. 5, and related text above), for both space purposes and time purposes.

Regarding space, it is difficult to give a precise measure of how much space PUPTE can save because this largely depends on the data distribution and the compression schemes employed. However, even in the worst case, the space consumption of the IMDBS 100 (see FIG. 1) using the PUPTE process is expected to be no more than that of the page loadable column process (method 2 discussed above) because the PUPTE process may fallback to page loadable columns in the worst case. In the worst case, no chunk can be compressed, so the IMDBS 100 picks a chunk size aligned for uncompressed chunks. What results is pages of the same size, all as filled as can be with uncompressed n-bit encoded values. This is equivalent to n-bit encoding over the entire data vector. In the general case of course, PUPTE provides better performance than the page loadable column process because the IMDBS 100 applies a secondary encoding scheme whenever possible on chunks of the data vector (e.g., through compression). This saves space so long as a compressed chunk can fit into a smaller page than an uncompressed chunk. Again, the exact amount of space used depends on the data and compression method, but this can easily be orders of magnitude less than that of page loadable columns (which uses uniform compression, and no secondary compression).

The average amount of space saved is reduced because in PUPTE the data must be stored on pages at a time, potentially resulting in lots of internal fragmentation, but the choice of chunk sizes helps mitigate this. Let us assume that the length of the data vector is long enough so that, with the right choice of chunk size, the IMDBS 100 can meet the desired condition that all chunks use up at least a minimum threshold of space in their allocated page. In our case, we wanted all pages to be at least 25% full. This means the allocated space is no more than 4× the required space. Thus, the effectiveness of the compression rates in PUPTE is still at least 25% of what they could theoretically be if no space was wasted in any page. For example, if a data vector can be compressed by a factor of 20, we can expect compression by a factor of at least 5 in the worst case when applying the PUPTE encoding scheme.

We expect much better results in most cases. Since the IMDBS 100 uses alignment, if the compressibility of different chunks doesn't vary too much, then most of the chunks should almost fill their entire page. Even if there is inconsistency in compressibility, the PUPTE process may still have very good performance because the IMDBS 100 compresses chunks separately so that if one chunk cannot be well compressed, this does not directly affect the ability of another chunk to be compressed. In fact, the IMDBS 100 may even perform better than with page loadable columns that do not need paging. This is because encoding with the page loadable column process uses a single compression method over the entire data vector, and can fall short in a situation where it would be preferable to use different compression methods on distinct parts of the data vector. Also in general, some of the secondary compression methods in the IMDBS 100 rely on storing lengths or position offsets. These values would require fewer bits to store if they were to reference smaller chunks as opposed to the entire data vector.

Regarding time, disk I/O in database systems is significantly more expensive than memory I/O, so writing to disk is the bottleneck in construction run-time. The time to write to disk depends on how much page space is used by the encoded PUPTE data structure. This could be a combination of the total size of all pages used or the total number of pages used. Since the PUPTE encoding scheme ultimately compresses the data, saving space, this in turn also reduces page-writing time.

As for the rest of the process that works on main memory, encoding each chunk involves first selecting the chunk size (see 502 in FIG. 5), followed by storing the actual contents (see 504 in FIG. 5). Although part of chunk size selection resembles storing the actual contents, it is not quite identical because it avoids the complexity of recursive storing since this is not necessary to approximate the required space. At each level of the tree structure (see FIG. 3), the chunks in each node in the level could do no worse than combine to make up the entire data vector, if somehow all chunks in all nodes were oversized. This adds O(enc(L)) additional time for each level to both select the chunk sizes and store the actual contents, as explained above regarding the time analysis. Moreover, the number of times this can happen is finite because the UPT has bounded height. Recall that sub-chunk sizes are always at most half the previous chunk size. Also, recall that we can only have an oversized chunk if the ratio between the largest required chunk space and the smallest required space exceeds the ratio between the largest allowed space (largest page size; e.g. 1 MB) to the smallest allowed space (e.g. 1 kB), which is 1024 for those example page sizes. Then if the chunk size is less than 1024, there should be no way of having any more oversized chunks. Lastly, in an embodiment, the maximum length of the data vector may be $2^{32}$. Thus, the maximum height is no worse than the following:

$$\log_2 L - \log_2 1024 \leq 32 - 10 = 22$$

Thus, encoding is O(enc(L)·log L).

Decoding

This section provides more details for reading from the PUPT data structure (see 406-408 in FIG. 4). This process is referred to as decoding. Reading from a PUPT data structure generally involves finding a value at a given row position. This process is generally as follows. First, the IMDBS 100 (see FIG. 1) determines the chunk in the PUPT data structure that contains the value at the given row position. Second, the IMDBS 100 loads the page that has that chunk. Third, the IMDBS 100 reads the value from the loaded page.

More specifically, the IMDBS 100 may use the following process to retrieve value IDs for given rows. Suppose the IMDBS 100 is instructed to get the value IDs in an encoded data vector for all rows in the set R. To do this efficiently, each time the IMDBS 100 loads the page for any (sub-) chunk P in order to get the value for some row r∈P∩R, it does not just get the value ID for r, but all rows in P∩R. This way, the IMDBS 100 does not have to load the page for P more than once.

The IMDBS 100 starts by traversing the PUPT data structure (see FIG. 3) from the root node (e.g., 302), one chunk at a time. The IMDBS 100 looks for the smallest row r that has not yet been queried, gets values for all rows in the same chunk P as that row, and repeats.

If P is a regular chunk, then all rows contained in P should be stored on the page that the IMDBS 100 just loaded, so it is very easy to load the desired values.

Otherwise, P is an oversized chunk, and its values can be stored in a hierarchy of nodes and pages. The correct page to load for a row could be in the sequence of pages of any node at any depth, and the IMDBS 100 performs the following process to determine which one.

Since P is in the root node, the page that was just loaded contains a list of reference tuples to all sub-nodes of P (as mentioned above in the Encoding section). Moreover, this list is sorted in such a way that the first node whose bounds encompass a given row is the node the row is stored in. This is because although the bounds of a parent node also encompass a row stored in a child node, in the PUPT data structure, child nodes always occur before their parents in our reference list (see above discussion in the Chunk Size Selection section). In general, a row's value is stored in the deepest node whose bounds encompass the row. To find the correct reference tuple, the IMDBS 100 iterates sequentially in the forward direction until it reaches the first node whose starting row is less than or equal to the row it is searching for. The IMDBS 100 knows starting from which page the node is stored from the node reference.

Thus, this process for searching all rows in the oversized chunk P is like searching over the entire data vector, although one crucial difference is that the IMDBS 100 should not encounter any more oversized chunks because it always looks in the node that actually stores the row. First, the IMDBS 100 looks for the smallest row in P∩R that has not yet been queried. Then, the IMDBS 100 determines the node L and the chunk P' within L that the row is stored in. Then the IMDBS 100 loads the page that represents P' and gets the values for all the rows in P'∩R. Then the IMDBS 100 repeat these steps until it has gotten the values for all rows in P∩R.

When getting values from a page, the IMDBS 100 does so according to existing decoding algorithms specific to whatever compression method was used on the chunk. These may be optimized if the set of rows that the IMDBS 100 is searching for is a range. Depending on how values are encoded, this process may be much more efficient for sequential access over random access.

Overall Complexity Analysis

This section discusses the performance of the PUPTE process, in comparison to other existing processes such as the page loadable column process.

We first evaluate the performance of getting the value ID for a single row. Similar to what we explained in the section Complexity Analysis for Encoding above, the bottleneck operation during row accesses is loading pages. Referring to the process described in the Decoding section above, this takes either one or two page loads. The IMDBS 100 (see FIG. 1) first loads one page from the root node, which could already be the correct page that stores the desired row. Otherwise, the page loaded by the IMDBS 100 corresponds to a directory page that directs it to the correct page, involving one additional page load. Often though, the UPT tree structure (see FIG. 3) will only have a single node because having oversized chunks is not all too common, and in this case only one page load is always enough. But in comparison, the existing page loadable column process guarantees one page load is enough for all cases.

We now analyze the run time without regards to the loading operation. In the worst case, to identify the node that a row is stored in involves indexing from the reference list in a directory page. This involves a binary search to give a general location of the reference tuple, followed by a linear search to narrow down the search. The binary search is over all node reference tuples, which has time complexity logarithmic to the number of nodes. The linear search can only be performed at worst over all the nodes in the tree. In the section Complexity Analysis for Encoding above, we showed the height of the tree is $O(\log L)$, which tells us the number of nodes is $O(L)$. Thus, the total search time for a node is $O(L)$. After the IMDBS 100 identifies the node, it can determine the chunk with $O(1)$ arithmetic. The last step is decoding a value within the chunk, which is $O(dec(N))$, or just $O(dec(L))$. Thus, overall, the time complexity for getting the value of a single row is as follows:

$$O(L)+O(dec(L))$$

However, if the IMDBS 100 is querying for multiple values at a time, we can expect even better performance in both the number of page loads and the general time complexity.

$$O(dec(L))$$

The decoding process ensures that the IMDBS 100 does not need to access the same page twice, which otherwise could risk worse performance if a page were evicted from the page buffer after the first use, and later re-loaded. The current paged data vector also benefits from this, but it is more beneficial if lots of query values are stored in the same pages, especially for the PUPTE process that can compress more values onto each page. The cost of determining which page a row is on and loading the page will be shared over multiple rows, with a small additional cost of determining which rows are on the same page. The average run time of decoding values within a page may also be improved, especially if the rows the IMDBS 100 is querying for are consecutive, as would be for example in the case of doing a range scan. With multiple rows to read, there is more use for sequential access, which depending on the compression method used on the chunk corresponding to the page, may be much more efficient than random access.

Alternative Embodiments

This section discusses various alternative embodiments for the IMDBS 100 (see FIG. 1).

Firstly, due to the resulting increased simplicity, and slightly better worst-case encoding and decoding performance, it may be preferable to make the PUPT data structure (see FIG. 3) always use just one node. This can be accomplished by selecting the chunk size with only the largest, or least compressible, chunk in mind, and ensuring that it will be able to fit within the largest page size. This way, no chunk in the root node can be oversized. This comes at the cost of not providing as efficient storage when the range of needed space between chunks varies too greatly. Chunks that can be extremely small will still have to use at least the smallest page size, even if they actually need much less space than that. In comparison, the chunk size selection process discussed above (e.g., 502 in FIG. 5, FIG. 6, and the related text) had the smallest chunks in mind, making sure they would not waste too much space, at the cost of allowing oversized chunks.

Next, if a chunk in a node is oversized, it is still allocated a page like all other chunks in the node, even though its actual contents will be stored in a different node. Unless this chunk is in the root node, the page it is allocated doesn't have anything to store. In fact, that page would never even be loaded as it is not necessary as part of the decoding process. This of course results in wasted space. Alternatively, the IMDBS 100 may store some extra metadata in the page, such as anything pertaining to the child node that the chunk will correspond to. Another solution is for the IMDBS 100 to have empty pages within the page chain, such as with null references or null pointers, although the feasibility of this depends on the implementation of the paging system. Finally, the IMDBS 100 may store some sub-chunk (e.g. the first) of the child node within this page so that the child node has one less page to store. This may further complicate the decoding process, but should save one page of space for each additional node and not result in more page loads or other drastic performance impacts.

Another consideration is that a chunk that requires less space will only save space if there is a smaller page to use. Consequently, minimizing wasted space is largely a matter of the availability of page sizes. This is both in terms of range and granularity. Range refers to the magnitudes of the smallest available page size and the largest available page size. It is better for the minimum page size to be smaller so that chunks that do not use a lot of space are not forced into using an unnecessarily large page. It is also slightly better for there to be a wide difference between the smallest and largest page sizes so that there is a smaller chance of having oversized chunks that makes the data structure recursive and more complicated. On the other hand, granularity refers to how small the differences in size of consecutive page sizes are. It is better for page sizes to be more granular so that a chunk can use a better page size even if it is smaller by just a bit. For example, according to an existing in-memory database system, the first few page sizes are 4× larger than the previous. Then even if a chunk were 3× smaller than another chunk stored on these pages, it is possible that it could end up using the same page size. It would need to be up to 4× smaller before it can use a smaller page. To solve these issues, an alternative embodiment of the IMDBS 100 adds more page sizes, thus changing the underlying paging system.

Lastly, there is an inefficiency in the chunk size selection process discussed above (e.g., 502 in FIG. 5, FIG. 6, and the related text). Recall that the idea behind the PUPTE process was first picking an arbitrary initial chunk size (see 502a in FIG. 5), and then aggregating summary statistics on how compressible the chunks would be if we had partitioned the node with that chunk size (see 502d). The IMDBS 100 then picks the chunk size best suited for those summary statistics (see 502e). But in fact, using a different chunk size changes the contents of each chunk. Consequently, compression ratios for one chunk size are not always a good estimate of compression ratios for another. The PUPTE process is maximally effective under the assumption that compression ratios of chunks remain consistent as the IMDBS 100 changes the chunk size. While this may hold under many data distributions, it certainly will not in all cases. This is especially an issue if the initial chunk size gives a bad reflection of the global compressibility of the data vector. As a simple example, consider a data vector that can be compressed by a factor of 100 000. If the IMDBS 100 analyzes the data vector by picking an initial chunk size of only 1000, then each chunk probably won't be able to be compressed by more than a factor of 1000, which is far from how well the entire data vector can be compressed. To address this issue, the IMDBS 100 may perform the encoding process multiple times with multiple initial chunk sizes, and select the result with the highest compression.

CONCLUSION

In summary, the PUPTE process described above provides a solution for compressing paged data vectors in the IMDBS 100 (see FIG. 1). It allows paged data vectors to continue functioning in a manner similar to the existing page loadable columns process, where loading values from the data vector occurs in units of pages as opposed to loading the entire data structure at once. At the same time, the PUPTE process adds non-uniform compression to be used on the data, which can reduce space overhead, and thus the total cost of ownership.

Figure 8:
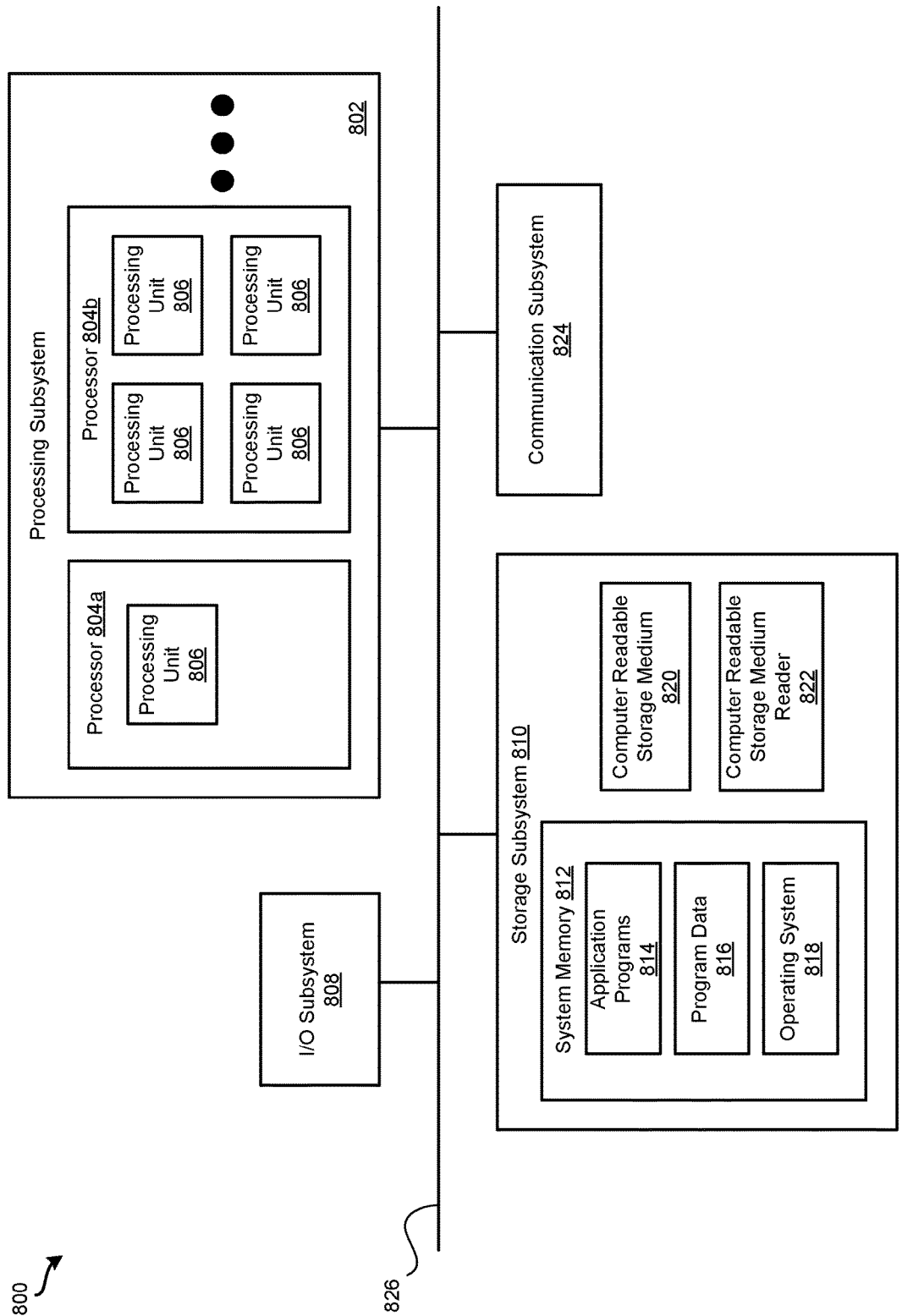
FIG. 8 is a block diagram of an example computer system 800 for implementing various embodiments described above.

FIG. 8 is a block diagram of an example computer system 800 for implementing various embodiments described above. For example, the computer system 800 may be used to implement the IMDBS 100 (see FIG. 1). The computer system 800 may be a desktop computer, a laptop, a server computer, or any other type of computer system or combination thereof. Some or all elements of the memory management system 130, the data processing system 140, or combinations thereof can be included or implemented in the computer system 800. In addition, the computer system 800 can implement many of the operations, methods, and/or processes described above (e.g., the method 200 of FIG. 2, the method 400 of FIG. 4, etc.). As shown in FIG. 8, the computer system 800 includes a processing subsystem 802, which communicates, via a bus subsystem 826, with an input/output (I/O) subsystem 808, a storage subsystem 810 and a communication subsystem 824.

The bus subsystem 826 is configured to facilitate communication among the various components and subsystems of the computer system 800. While the bus subsystem 826 is illustrated in FIG. 8 as a single bus, one of ordinary skill in the art will understand that the bus subsystem 826 may be implemented as multiple buses. The bus subsystem 826 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

The processing subsystem 802, which can be implemented as one or more integrated circuits (e.g., a conventional microprocessor or microcontroller), controls the operation of the computer system 800. The processing subsystem 802 may include one or more processors 804. Each processor 804 may include one processing unit 806 (e.g., a single core processor such as the processor 804a) or several processing units 806 (e.g., a multicore processor such as the processor 804*b*). In some embodiments, the processors 804 of the processing subsystem 802 may be implemented as independent processors while, in other embodiments, the processors 804 of the processing subsystem 802 may be implemented as multiple processors integrate into a single chip or multiple chips. Still, in some embodiments, the processors 804 of the processing subsystem 802 may be implemented as a combination of independent processors and multiple processors integrated into a single chip or multiple chips.

In some embodiments, the processing subsystem 802 may execute a variety of programs or processes in response to program code and can maintain multiple concurrently executing programs or processes. At any given time, some or all of the program code to be executed may reside in the processing subsystem 802 or in the storage subsystem 810. Through suitable programming, the processing subsystem 802 may provide various functionalities, such as the functionalities described above by reference to the method 200 (see FIG. 2), the method 400 (see FIG. 4), the method 500 (see FIG. 5), etc.

The I/O subsystem 808 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, or other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, or other types of devices and mechanisms for outputting information from the computer system 800 to a user or another device (e.g., a printer).

As illustrated in FIG. 8, the storage subsystem 810 includes a system memory 812, a computer-readable storage medium 820, and a computer-readable storage medium reader 822. The storage subsystem 810 may implement the main memory 110 or the secondary storage 120 (see FIG. 1). The system memory 812 may be configured to store software in the form of program instructions that are loadable and executable by the processing subsystem 802 as well as data generated during the execution of program instructions. In some embodiments, the system memory 812 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). The system memory 812 may include different types of memory, such as static random access memory (SRAM) and/or dynamic random access memory (DRAM). The system memory 812 may include a basic input/output system (BIOS), in some embodiments, that is configured to store basic routines to facilitate transferring information between elements within the computer system 800 (e.g., during start-up). Such a BIOS may be stored in ROM (e.g., a ROM chip), flash memory, or another type of memory that may be configured to store the BIOS.

As shown in FIG. 8, the system memory 812 includes application programs 814 (e.g., that implement the memory management system 130 or the data processing system 140 of FIG. 1), program data 816, and operating system (OS) 818. The OS 818 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, Palm OS, and WebOS operating systems.

The computer-readable storage medium 820 may be a non-transitory computer-readable medium configured to store software (e.g., programs, code modules, data constructs, instructions, etc.). Many of the components (e.g., the memory management system 130 or the data processing system 140 of FIG. 1, etc.) or processes (e.g., the method 200 of FIG. 2, the method 400 of FIG. 4, the method 500 of FIG. 5, etc.) described above may be implemented as software that when executed by a processor or processing unit (e.g., a processor or processing unit of the processing subsystem 802) performs the operations of such components and/or processes. The storage subsystem 810 may also store data used for, or generated during, the execution of the software.

The storage subsystem 810 may also include the computer-readable storage medium reader 822 that is configured to communicate with the computer-readable storage medium 820. Together and, optionally, in combination with the system memory 812, the computer-readable storage medium 820 may comprehensively represent remote, local, fixed, and/or removable storage devices plus storage media for temporarily and/or more permanently containing, storing, transmitting, and retrieving computer-readable information.

The computer-readable storage medium 820 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or other types of computer-readable storage media or device.

The communication subsystem 824 serves as an interface for receiving data from, and transmitting data to, other devices, computer systems, and networks. For example, the communication subsystem 824 may allow the computer system 800 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). The communication subsystem 824 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, or other components. In some embodiments, the communication subsystem 824 may provide components configured for wired communication (e.g., Ethernet) in addition to or instead of components configured for wireless communication.

One of ordinary skill in the art will realize that the architecture shown in FIG. 8 is only an example architecture of the computer system 800, and that the computer system 800 may have additional or fewer components than shown, or a different configuration of components. The various components shown in FIG. 8 may be implemented in hardware, software, firmware or any combination thereof, including one or more signal processing and/or application specific integrated circuits.

Figure 9:
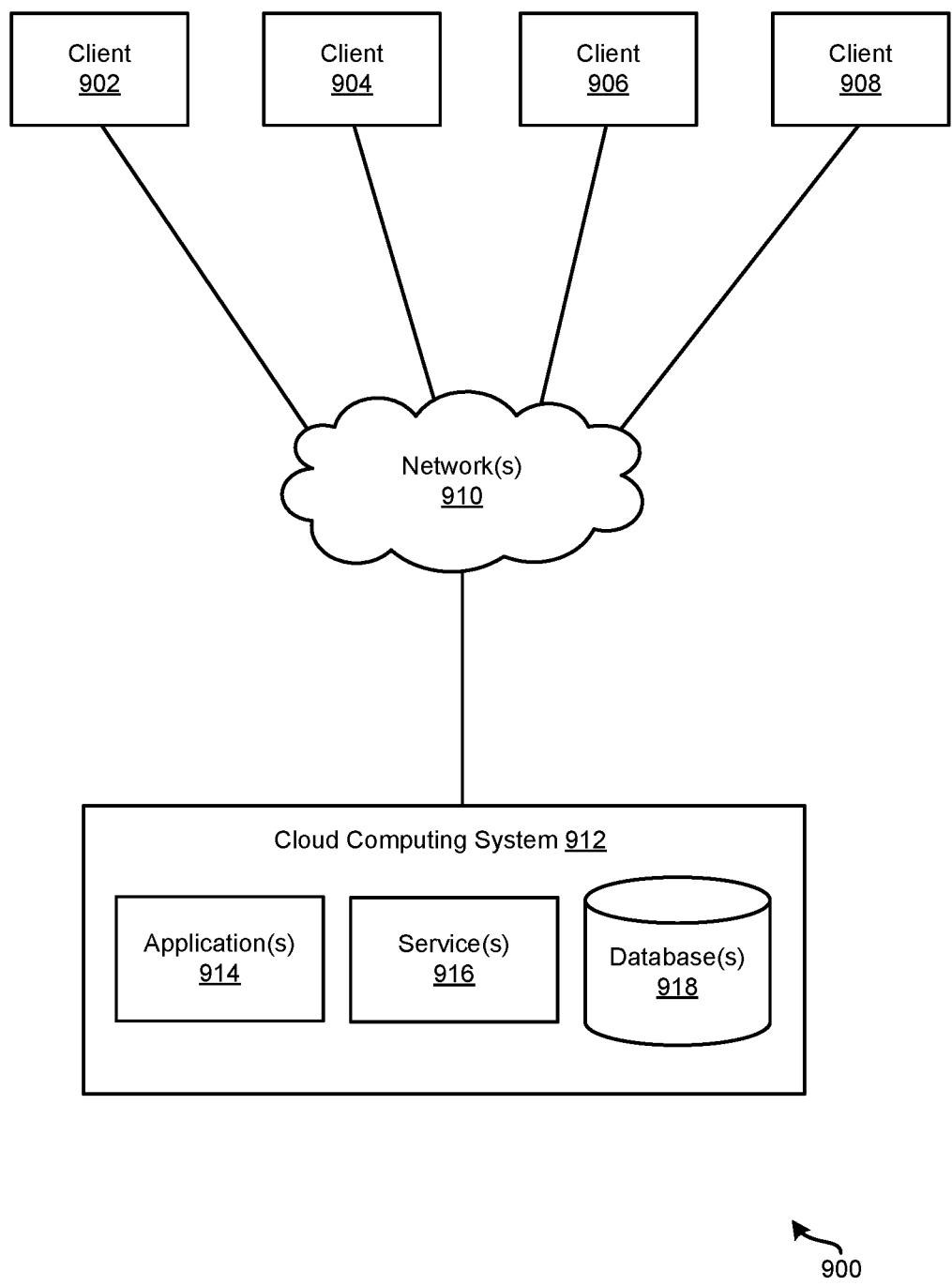
FIG. 9 is a block diagram of a cloud computing system 900 for implementing various embodiments described above.

FIG. 9 is a block diagram of a cloud computing system 900 for implementing various embodiments described above. For example, one of the client devices 902-908 may be used to implement a client device for accessing the IMDBS 100 (see FIG. 1), and a cloud computing system 912 of the system 900 may be used to implement the IMDBS 100 itself. As shown, the system 900 includes the client devices 902-908, one or more networks 910, and the cloud computing system 912. The cloud computing system 912 is configured to provide resources and data to the client devices 902-908 via the networks 910. In some embodiments, the cloud computing system 900 provides resources to any number of different users (e.g., customers, tenants, organizations, etc.). The cloud computing system 912 may be implemented by one or more computer systems (e.g., servers), virtual machines operating on a computer system, or a combination thereof.

As shown, the cloud computing system 912 includes one or more applications 914, one or more services 916, and one or more databases 918. The cloud computing system 900 may provide the applications 914, services 916, and databases 918 to any number of different customers in a self-service, subscription-based, elastically scalable, reliable, highly available, and secure manner.

In some embodiments, the cloud computing system 900 may be adapted to automatically provision, manage, and track a customer's subscriptions to services offered by the cloud computing system 900. The cloud computing system 900 may provide cloud services via different deployment models. For example, cloud services may be provided under a public cloud model in which the cloud computing system 900 is owned by an organization selling cloud services and the cloud services are made available to the general public or different industry enterprises. As another example, cloud services may be provided under a private cloud model in which the cloud computing system 900 is operated solely for a single organization and may provide cloud services for one or more entities within the organization. The cloud services may also be provided under a community cloud model in which the cloud computing system 900 and the cloud services provided by the cloud computing system 900 are shared by several organizations in a related community. The cloud services may also be provided under a hybrid cloud model, which is a combination of two or more of the aforementioned different models.

In some instances, any one of the applications 914, services 916, and databases 918 made available to the client devices 902-908 via the networks 910 from the cloud computing system 900 is referred to as a "cloud service". Typically, servers and systems that make up the cloud computing system 900 are different from the on-premises servers and systems of a customer. For example, the cloud computing system 900 may host an application and a user of one of client devices 902-908 may order and use the application via the networks 910.

The applications 914 may include software applications that are configured to execute on the cloud computing system 912 (e.g., a computer system or a virtual machine operating on a computer system) and be accessed, controlled, managed, etc. via the client devices 902-908. In some embodiments, the applications 914 may include server applications and/or mid-tier applications (e.g., HTTP (hypertext transport protocol) server applications, FTP (file transfer protocol) server applications, CGI (common gateway interface) server applications, JAVA server applications, etc.). The services 916 are software components, modules, application, etc. that are configured to execute on the cloud computing system 912 and provide functionalities to the client devices 902-908 via the networks 910. The services 916 may be web-based services or on-demand cloud services.

The databases 918 are configured to store and/or manage data that is accessed by the applications 914, the services 916, or the client devices 902-908. For instance, the UPT structure 300 (see FIG. 3) may be stored in the databases 918. The databases 918 may reside on a non-transitory storage medium local to (and/or resident in) the cloud computing system 912, in a storage-area network (SAN), or on a non-transitory storage medium local located remotely from the cloud computing system 912. In some embodiments, the databases 918 may relational databases that are managed by a relational database management system (RDBMS), etc. The databases 918 may be a column-oriented databases, row-oriented databases, or a combination thereof. In some embodiments, some or all of the databases 918 are in-memory databases. That is, in some such embodiments, data for the databases 918 are stored and managed in memory (e.g., random access memory (RAM)).

The client devices 902-908 are configured to execute and operate a client application (e.g., a web browser, a proprietary client application, etc.) that communicates with the applications 914, services 1716, or databases 918 via the networks 910. This way, the client devices 902-908 may access the various functionalities provided by the applications 914, services 916, and databases 918 while the applications 914, services 916, and databases 918 are operating (e.g., hosted) on the cloud computing system 900. The client devices 902-908 may be the computer system 800 (see FIG. 8). Although the system 900 is shown with four client devices, any number of client devices may be supported.

The networks 910 may be any type of network configured to facilitate data communications among the client devices 902-908 and the cloud computing system 912 using any of a variety of network protocols. The networks 910 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer implemented method of memory management for an in-memory database, the method comprising:
   storing, in a secondary storage, a paged data vector, wherein the paged data vector includes a plurality of chunks, wherein the plurality of chunks are compressed using non-uniform compression, and wherein the plurality of chunks are logically arranged in the paged data vector as a plurality of pages;
   receiving a data request;
   identifying a subset of the plurality of pages that relate to the data request;
   loading, from the secondary storage to a main memory, at least one page of the subset of the plurality of pages that have been identified as relating to the data request; and
   executing the data request using the at least one page of the subset of the plurality of pages in the main memory,
   wherein the paged data vector is generated by a method including:
      calculating a chunk size for a data vector; and
      encoding the data vector according to the chunk size to form a paged uniform-partition tree data structure corresponding to the paged data vector, and
   wherein encoding the data vector comprises:
      constructing a root node as a page chain, partitioning the data vector according to the chunk size to form the plurality of chunks, and encoding each of the plurality of chunks into a transient data structure using a respective selected compression type, wherein the page chain is initially an empty page chain; and
      moving each of the plurality of chunks that has a regular size from the transient data structure into a smallest fitting page, and appending each smallest fitting page onto the page chain.

2. The method of claim 1, wherein for the non-uniform compression, at least a first chunk is compressed using a first compression type and at least a second chunk is compressed using a second compression type, wherein the first chunk differs from the second chunk, and wherein the first compression type differs from the second compression type.

3. The method of claim 1, wherein calculating the chunk size comprises:
   selecting an initial chunk size;
   partitioning the data vector into a plurality of preliminary chunks;
   compressing each of the plurality of preliminary chunks using a respective selected compression type, and calculating a plurality of compression ratios;
   setting a target compression ratio based on comparing the compression ratios and an error tolerance; and
   calculating a target space amount based on the compression ratios, and calculating a page size based on a smallest fitting page that fits the target space amount, wherein the chunk size is calculated to minimally target the target compression ratio.

4. The method of claim 1, wherein encoding the data vector further comprises:
   appending an empty page for each of the plurality of chunks that is oversized onto the page chain with a reference to a child node;
   recursively storing each of the plurality of chunks that is oversized into a respective child node.

5. The method of claim 1, wherein identifying the subset of the plurality of pages that relate to the data request comprises:
   traversing the plurality of chunks in the paged data structure, starting at a root node, one chunk at a time.

6. The method of claim 1, wherein the paged data vector has a root node and at least one child node.

7. The method of claim 6, wherein the root node corresponds to a logical representation of the plurality of chunks, and wherein a child node corresponds to a single chunk of the plurality of chunks of the root node.

8. The method of claim 6, wherein the at least one child node corresponds to at least one oversize chunk, wherein a particular child node corresponds to a particular oversize chunk.

9. The method of claim 6, wherein the at least one child node corresponds to a plurality of child nodes including a first child node and a second child node, wherein the second child node is a child of the first child node.

10. The method of claim 1, wherein the paged data vector has a root node that is a single node that contains the plurality of chunks.

11. A non-transitory computer readable medium storing a computer program for controlling a computer system to execute processing for memory management for an in-memory database, the processing comprising:
   storing, in a secondary storage, a paged data vector, wherein the paged data vector includes a plurality of chunks, wherein the plurality of chunks are compressed using non-uniform compression, and wherein the plurality of chunks are logically arranged in the paged data vector as a plurality of pages;
   receiving a data request;
   identifying a subset of the plurality of pages that relate to the data request;
   loading, from the secondary storage to a main memory, at least one page of the subset of the plurality of pages that have been identified as relating to the data request; and
   executing the data request using the at least one page of the subset of the plurality of pages in the main memory,
   wherein the paged data vector is generated by processing that includes:
      calculating a chunk size for a data vector; and
      encoding the data vector according to the chunk size to form a paged uniform-partition tree data structure corresponding to the paged data vector, and
   wherein encoding the data vector comprises:
      constructing a root node as a page chain, partitioning the data vector according to the chunk size to form the plurality of chunks, and encoding each of the plurality of chunks into a transient data structure using a respective selected compression type, wherein the page chain is initially an empty page chain; and
      moving each of the plurality of chunks that has a regular size from the transient data structure into a smallest fitting page, and appending each smallest fitting page onto the page chain.

12. The non-transitory computer readable medium of claim 11, wherein for the non-uniform compression, at least a first chunk is compressed using a first compression type and at least a second chunk is compressed using a second compression type, wherein the first chunk differs from the second chunk, and wherein the first compression type differs from the second compression type.

13. The non-transitory computer readable medium of claim 11, wherein calculating the chunk size comprises:

selecting an initial chunk size;
partitioning the data vector into a plurality of preliminary chunks;
compressing each of the plurality of preliminary chunks using a respective selected compression type, and calculating a plurality of compression ratios;
setting a target compression ratio based on comparing the compression ratios and an error tolerance; and
calculating a target space amount based on the compression ratios, and calculating a page size based on a smallest fitting page that fits the target space amount, wherein the chunk size is calculated to minimally target the target compression ratio.

14. A system for memory management for an in-memory database, the system comprising:
   at least one processor that is configured to control the system to receive a data request;
   a main memory;
   a secondary storage that is configured to store a paged data vector, wherein the paged data vector includes a plurality of chunks, wherein the plurality of chunks are compressed using non-uniform compression, and wherein the plurality of chunks are logically arranged in the paged data vector as a plurality of pages;
   a decoder component that is configured to identify a subset of the plurality of pages that relate to the data request; and
   a page loader component that is configured to load, from the secondary storage to the main memory, at least one page of the subset of the plurality of pages that have been identified as relating to the data request,
   wherein the at least one processor is configured to control the system to execute the data request using the at least one page of the subset of the plurality of pages in the main memory,
   the system further comprising:
      a chunk size calculator component that is configured to calculate a chunk size for a data vector; and
      an encoder component that is configured to encode the data vector according to the chunk size to form a paged uniform-partition tree data structure corresponding to the paged data vector, and
   wherein encoding the data vector comprises:
      constructing a root node as a page chain, partitioning the data vector according to the chunk size to form the plurality of chunks, and encoding each of the plurality of chunks into a transient data structure using a respective selected compression type, wherein the page chain is initially an empty page chain; and
      moving each of the plurality of chunks that has a regular size from the transient data structure into a smallest fitting page, and appending each smallest fitting page onto the page chain.

15. The system of claim 14, wherein for the non-uniform compression, at least a first chunk is compressed using a first compression type and at least a second chunk is compressed using a second compression type, wherein the first chunk differs from the second chunk, and wherein the first compression type differs from the second compression type.

16. The system of claim 14, wherein calculating the chunk size comprises:
   selecting an initial chunk size;
   partitioning the data vector into a plurality of preliminary chunks;
   compressing each of the plurality of preliminary chunks using a respective selected compression type, and calculating a plurality of compression ratios;
   setting a target compression ratio based on comparing the compression ratios and an error tolerance; and
   calculating a target space amount based on the compression ratios, and calculating a page size based on a smallest fitting page that fits the target space amount, wherein the chunk size is calculated to minimally target the target compression ratio.

17. The non-transitory computer readable medium of claim 11, wherein encoding the data vector further comprises:
   appending an empty page for each of the plurality of chunks that is oversized onto the page chain with a reference to a child node;
   recursively storing each of the plurality of chunks that is oversized into a respective child node.

18. The non-transitory computer readable medium of claim 11, wherein identifying the subset of the plurality of pages that relate to the data request comprises:
   traversing the plurality of chunks in the paged data structure, starting at a root node, one chunk at a time.

19. The non-transitory computer readable medium of claim 11, wherein the paged data vector has a root node and at least one child node.

20. The non-transitory computer readable medium of claim 19, wherein the root node corresponds to a logical representation of the plurality of chunks, and wherein a child node corresponds to a single chunk of the plurality of chunks of the root node.

21. The non-transitory computer readable medium of claim 19, wherein the at least one child node corresponds to at least one oversize chunk, wherein a particular child node corresponds to a particular oversize chunk.

22. The non-transitory computer readable medium of claim 19, wherein the at least one child node corresponds to a plurality of child nodes including a first child node and a second child node, wherein the second child node is a child of the first child node.

23. The non-transitory computer readable medium of claim 11, wherein the paged data vector has a root node that is a single node that contains the plurality of chunks.

24. The system of claim 14, wherein encoding the data vector further comprises:
   appending an empty page for each of the plurality of chunks that is oversized onto the page chain with a reference to a child node;
   recursively storing each of the plurality of chunks that is oversized into a respective child node.

25. The system of claim 14, wherein identifying the subset of the plurality of pages that relate to the data request comprises:
   traversing the plurality of chunks in the paged data structure, starting at a root node, one chunk at a time.

26. The system of claim 14, wherein the paged data vector has a root node and at least one child node.

27. The system of claim 26, wherein the root node corresponds to a logical representation of the plurality of chunks, and wherein a child node corresponds to a single chunk of the plurality of chunks of the root node.

28. The system of claim 26, wherein the at least one child node corresponds to at least one oversize chunk, wherein a particular child node corresponds to a particular oversize chunk.

29. The system of claim 26, wherein the at least one child node corresponds to a plurality of child nodes including a first child node and a second child node, wherein the second child node is a child of the first child node.

30. The system of claim 14, wherein the paged data vector has a root node that is a single node that contains the plurality of chunks.

* * * * *